(12) United States Patent
Yakabe

(10) Patent No.: US 7,038,845 B2
(45) Date of Patent: May 2, 2006

(54) OPTICAL AMPLIFIER AND OPTICAL FIBER LASER

(75) Inventor: Yoshiyuki Yakabe, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 10/606,773

(22) Filed: Jun. 27, 2003

(65) Prior Publication Data

US 2004/0001249 A1    Jan. 1, 2004

(30) Foreign Application Priority Data

Jun. 27, 2002    (JP)    ............... 2002-187988

(51) Int. Cl.
*H04B 10/12* (2006.01)
*C03B 37/075* (2006.01)

(52) U.S. Cl. ..................... 359/341.5; 65/390
(58) Field of Classification Search ............ 359/341.5; 65/390
See application file for complete search history.

(56) References Cited

U.S. PATENT DOCUMENTS

| | | | |
|---|---|---|---|
| 5,668,659 A * | 9/1997 | Sakamoto et al. | 359/341.5 |
| 6,411,432 B1 * | 6/2002 | Kasamatsu | 359/341.33 |
| 2002/0033997 A1 * | 3/2002 | Choi et al. | 359/341.1 |

FOREIGN PATENT DOCUMENTS

| | | |
|---|---|---|
| JP | 6-112576 | 4/1994 |
| JP | 8-152531 | 6/1996 |
| JP | 2001-189510 | 7/2001 |
| JP | 2002-57396 | 2/2002 |

OTHER PUBLICATIONS

Sakamoto et al., "35-dB Gain Tm-Doped ZBLYAN Fiber Amplifier Operating at 1.65 μm", IEEE Photonics Technology Letters, vol. 8, No. 3, Mar. 1996, pp. 349-351.
"Erbium Doped Fluorozirconate Fibre Laser Operating at 1.66 and 1.72 μm", Electronics Letters, vol. 26, No. 10, May 10, 1990, pp. 649-651.
"Upconversion Pumped Green Lasing In Erbium Doped Fluorozirconate Fibre", Electronics Letters, vol. 27, No. 20, Sep. 26, 1991, pp. 1785-1786.
"23 dB Gain Upconversion Pumped Erbium Doped Fibre Amplifier Operating at 850 nm", Electronics Letters, vol. 27, No. 2, Jan. 17, 1991, pp. 184-186.

(Continued)

*Primary Examiner*—Deandra M. Hughes
(74) *Attorney, Agent, or Firm*—Young & Thompson

(57) ABSTRACT

An optical amplifier including: an erbium-doped amplifier medium, a first excitation generator and a second excitation generator. The first excitation generator is adopted to cause a first type excitation of the at least one kind of rare-earth ions to cause a population inversion between the laser upper level and the laser lower level. The second excitation generator is adopted to cause a second type excitation of the at least one kind of rare-earth ions from the excited state absorption lower level to a high excited level which is equal to or higher than the laser upper level.

37 Claims, 16 Drawing Sheets

OTHER PUBLICATIONS

"Up-Conversion cascade laser at 1.7 μm with simultaneous 2.7 μm lasing in erbium ZBLAN fibre", Electronics Letters, vol. 31, No. 5, Mar. 2, 1995, pp. 373-374.

Sankawa et al., "An Optical Fiber Amplifier for Wide-Band Wavelength Range Around 1.65 μm", IEEE Photonics Technology Letters, vol. 2, No. 6, Jun. 1990, pp. 422-424.

Choi et al., "$Pr^{3+}$-doped selenide fiber for 1610-1650 nm optical amplifiers", Electronics and Telecommunications Research Institute, Sep. 2000.

Tsuzaki et al., "Proceedings of the 2000 Communications Society Conference of IEICE", Oct. 2000, p. 337.

* cited by examiner

OPTICAL AMPLIFIER AND OPTICAL FIBER LASER

BACKGROUND OF THE INVENTION

1. Field of the Invention

The present invention relates to an optical amplifier, and more particularly to a laser amplifier for amplifying a laser propagating in an amplifier medium at a high gain as well as an optical fiber laser.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

In recent years, a wavelength multiplexing transmission technique is important for an optical communication with a large capacity. An optical fiber comprising a quart-glass has widely been used as a medium for allowing a signal light propagation for the optical communication. A low loss wavelength band of the quart-glass fiber is ranged from 1450 nm to 1650 nm. In this wavelength band, C-band (1530 nm to 1560 nm-wavelength band) and L-band (1570 nm to 1610 nm-wavelength band) have been utilized for the optical communication, wherein those C-band and L-band may be amplified by an erbium doped fiber amplifier. In order to response to an increased total transmission capacity, it is effective to broaden the transmission wavelength band. In this point of view, another lower loss wavelength of 1650 nm-band is attractive.

The existent erbium doped fiber amplifier limits the amplification wavelength at about 1610 nm for the following reasons. The existent erbium doped fiber amplifier performs amplification depending upon a stimulated emission transition of erbium ions from the excited state absorption lower level ($^4I_{13/2}$) to the ground level ($^4I_{15/2}$). In the existent erbium doped fiber amplifier, a signal excited state absorption of a signal light with a wavelength of at least 1610 nm is caused by the erbium ion at the excited state absorption lower level ($^4I_{13/2}$), whereby a gain is reduced. This is unavoidable.

Whereas some optical amplifiers of the 1650 nm-wavelength-band have been reported, no practicable optical amplifier has been yet realized in view of efficiency, gain, fabrication of the fiber, and reliability thereof.

One of the conventional optical amplifier with the 1650 nm-wavelength band has been reported in 1996, IEEE, Photonics Technology Letters, Vol. 8–3, pp. 349–351, wherein a thulium ion ($Tm^{3+}$) doped fluoride glass fiber amplifier is presented. Thulium ions doped in the cladding region of the fiber absorb a stimulated emission light with a peak wavelength of near 1.85 micrometers which is caused by a stimulated emission transition from an energy level ($^3F_4$) to an energy level of another energy level ($^3H_6$), so that a stimulated emission only remains in the 1650-nm-wavelength-band which corresponds to a short wavelength side base portion of this transition, whereby a gain of at least 25 dB could be obtained in the wavelength band from 1650 nm to 1670 nm. This technique is disclosed in Japanese laid-open patent publication No. 8-152531.

The optical amplifier disclosed in the above publication performs a low amplification efficiency of 0.22% in consideration of the non-optimum configuration thereof. The above publication is silent on the noise figure. In this conventional optical amplifier, an additional dopant of terbium ions is introduced into the cladding region and a majority of the emission energy is absorbed by terbium ions. For this reason, a light-to-light conversion efficiency is much lower than the conventional erbium doped fiber amplifier.

Another reported was made in 1990 IEEE Photonics Technology Letters, vol. 2–6, pp. 422–424, wherein a thulium ion ($Tm^{3+}$) doped quartz-glass fiber performs a gain of 2 dB at a wavelength of 1.69 micrometers. This gain does not satisfy the actual requirement for a relay amplifier in the optical communication system.

A praseodymium-doped selenide glass fiber amplifier with the 1650 nm-wavelength-band is disclosed in European Conference On Optical Communication in 2000, but this fiber amplifier has not yet been practiced.

A broadband fiber Raman-amplifier over 1.65-micrometers-band employing high non-linear optical fiber is disclosed in Proceedings Of The 2000 Communications Society Conference If IEICE, but this fiber amplifier has not yet been practiced.

In 1990 IEEE Electronics Letters vol. 26–10, pp. 649–651, it is disclosed that an emission spectrum due to an emission transition from the laser upper level ($^2H_{11/2}$) to the laser lower level ($^4I_{9/2}$) or another emission transition from the laser upper level ($^4S_{3/2}$) to the laser lower level ($^4I_{9/2}$) is broaden in the wavelength band from 1620 nm to 1720 nm as shown in FIG. 16. The laser upper levels ($^4S_{3/2}$) and ($^2H_{11/2}$) are different in energy level by approximately 830 $cm^{-1}$, and which are thermally coped to each other by an energy (210 $cm^{-1}$) at an ordinarily temperature. The laser upper levels ($^4S_{3/2}$) and ($^2H_{11/2}$) will, hereinafter, be considered to be an united energy level ($^4S_{3/2}$, and $^2H_{11/2}$).

A probability of a spontaneous emission transition from the laser upper level ($^4S_{3/2}$) to the ground level ($^4I_{15/2}$) of erbium ion is higher by 18 times than a probability of a spontaneous emission transition from the laser upper level ($^4S_{3/2}$) to the laser lower level ($^4I_{9/2}$) of erbium ion. This spontaneous emission light has a 550-wavelength-band. A probability of another spontaneous emission transition from the laser upper level ($^4S_{3/2}$) to the excited state absorption lower level ($^4I_{13/2}$) of erbium ion is higher by 7 times than the probability of the spontaneous emission transition from the laser upper level ($^4S_{3/2}$) to the laser lower level ($^4I_{9/2}$) of erbium ion. This spontaneous emission light has a 850-wavelength-band.

A laser emission at a 546 nm-wavelength due to the emission transition from the laser upper level ($^4S_{3/2}$) to the ground level ($^4I_{15/2}$) with a single wavelength excitation at 801 nm is disclosed in 1991 IEEE, Electronics Letters Vol. 27–20, pp. 1785–1786.

A laser amplifier at a 850 nm-wavelength due to the emission transition from the laser upper level ($^4S_{3/2}$) to the excited state absorption lower level ($^4I_{13/2}$) with a single wavelength excitation at 801 nm is disclosed in 1991 IEEE, Electronics Letters Vol. 27–2, pp. 184–186.

A laser emission at a wavelength of 2.7 micrometers due to an emission transition from an energy level ($^4I_{11/2}$) to the excited state absorption lower level ($^4I_{13/2}$) of erbium ion is disclosed in 1995 IEEE, Electronics Letters Vol. 31–5, pp. 373–374, wherein a secondary laser emission at a wavelength of 1.7 micrometers is caused at the same time of a primary laser emission of a wavelength of 2.7 micrometers for assisting the primary laser emission.

The existent erbium doped fiber amplifier limits an amplification wavelength band into a 1610 nm-band. The amplification of the signal light at the 1650 nm-band due to a stimulated emission transition from the laser upper level ($^4S_{3/2}$, and $^2H_{11/2}$) to the laser lower level ($^4I_{9/2}$) of erbium ion. In this case, a life-time of erbium ion at the excited state absorption lower level ($^4I_{13/2}$) is long, for example, 10 ms. For this reason, the signal light excited state absorption reduces the gain.

About 50% of the accumulated energy at the laser upper level ($^4S_{3/2}$, and $^2H_{11/2}$) are lost by an omnidirection emission including a spontaneous emission of a 550 nm-wavelength-band due to the emission transition from the laser upper level ($^4S_{3/2}$) to the ground level ($^4I_{15/2}$) and another spontaneous emission of a 850 nm-wavelength-band due to the emission transition from the laser upper level ($^4S_{3/2}$) to the excited state absorption lower level ($^4I_{13/2}$). This results in a reduced efficiency of the amplifier.

In the fiber amplifier, a part of the spontaneous emission light is amplified with a propagation thereof through the fiber amplifier. This amplified spontaneous emission light is so called to as amplified spontaneous emission light. The amplified spontaneous emission light prevents an optical amplification at a 1650 nm-wavelength-band due to the emission transition from the laser upper level ($^4S_{3/2}$, and $^2H_{11/2}$) to the laser lower level ($^4I_{9/2}$), whereby any high gain can not be obtained.

In the above circumstances, the development of a novel optical amplifier free from the above problems is desirable.

SUMMARY OF THE INVENTION

Accordingly, it is an object of the present invention to provide a novel optical amplifier free from the above problems.

It is a further object of the present invention to provide a novel optical amplifier which is capable of suppressing a signal light excited state absorption by a rear-earth ion at the excited state absorption lower level and realizing a high gain and a high efficiency of amplification of the signal light.

It is a still further object of the present invention to provide a novel laser device free from the above problems.

It is yet a further object of the present invention to provide a novel laser device which is capable of suppressing a signal light excited state absorption by a rear-earth ion at the excited state absorption lower level and realizing a high gain and a high efficiency of amplification of the signal light.

The present invention provides an optical amplifier including: an amplifier medium, a first excitation generator and a second excitation generator. The amplifier medium allows a propagation of a signal light which is subject to an amplification. The amplifier medium is doped with at least one kind of rare-earth ions. Each of the at least one kind of rare-earth ions has an energy level system which includes: a ground level; a first pair of a laser upper level and a laser lower level which is higher than the ground level and lower than the laser upper level ; and a second pair of an excited state absorption upper level, and an excited state absorption lower level which is lower than the excited state absorption upper level, wherein the second pair allows absorbing an emission light generated by a transition from the laser upper level to the laser lower level, and wherein the excited state absorption lower level is higher than the ground level and lower than the laser upper level, and wherein the excited state absorption lower level is different from the laser lower level. The first excitation generator is adopted to cause a first type excitation of the at least one kind of rare-earth ions to cause a population inversion between the laser upper level and the laser lower level. The second excitation generator is adopted to cause a second type excitation of the at least one kind of rare-earth ions from the excited state absorption lower level to a high excited level which is equal to or higher than the laser upper level.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE INVENTION

Figure 1:
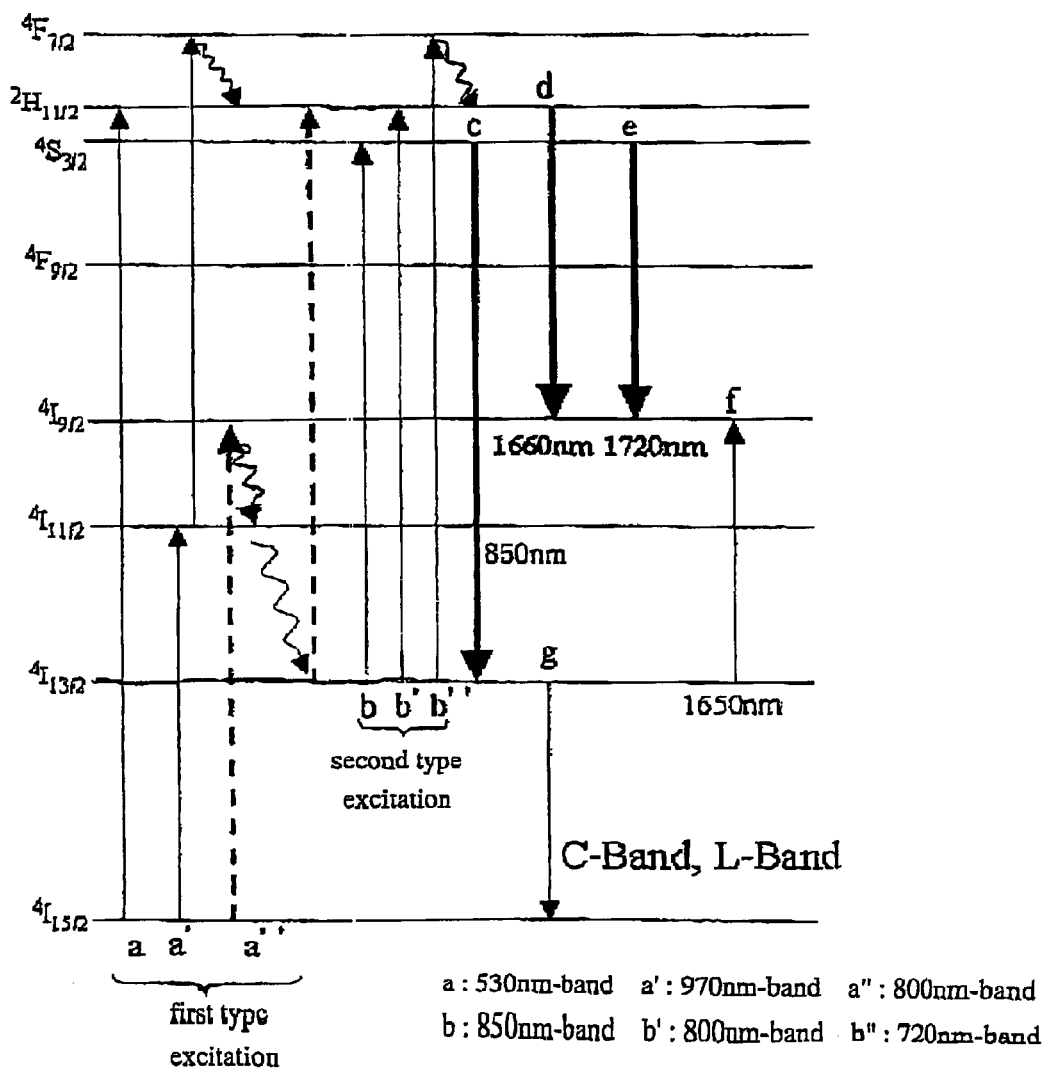
FIG. 1 is a diagram illustrative of energy levels of erbium ions in a medium.

A first aspect of the present invention is an optical amplifier including: an amplifier medium, a first excitation generator and a second excitation generator. The amplifier medium allows a propagation of a signal light which is subject to an amplification. The amplifier medium is doped with at least one kind of rare-earth ions. Each of the at least one kind of rare-earth ions has an energy level system which includes: a ground level; a first pair of a laser upper level and a laser lower level which is higher than the ground level and lower than the laser upper level; and a second pair of an excited state absorption upper level, and an excited state absorption lower level which is lower than the excited state absorption upper level, wherein the second pair allows absorbing an emission light generated by a transition from the laser upper level to the laser lower level, and wherein the excited state absorption lower level is higher than the ground level and lower than the laser upper level, and wherein the excited state absorption lower level is different from the laser lower level. The first excitation generator is adopted to cause a first type excitation of the at least one kind of rare-earth ions to cause a population inversion between the laser upper level and the laser lower level. The second excitation generator is adopted to cause a second type excitation of the at least one kind of rare-earth ions from the excited state absorption lower level to a high excited level which is equal to or higher than the laser upper level.

The first type excitation is a transition of the at least one kind of rare-earth ions from the ground level to the high excited level.

The first excitation generator may be adopted to generate at least one of first type excitation lights which cause the first type excitation, and the second excitation generator may be adopted to generate at least one of second type excitation lights which cause the first second type excitation, and the second type excitation lights are different in wavelength from the first type excitation lights.

The laser upper level may include at least one of plural different energy levels thermally coupled with each other. The laser lower level may include at least one of plural different energy levels thermally coupled with each other. The excited state absorption upper level may include at least one of plural different energy levels thermally coupled with each other. The excited state absorption lower level may include at least one of plural different energy levels thermally coupled with each other.

A first type excitation of at least one kind of rear-earth ions is a transition to cause a population inversion between the laser upper level and the laser lower level. The first type excitation is caused by the first excitation generator. The first excitation generator should not be limited to any particular device, but may typically and preferably comprise the first excitation light emitted from the first excitation generator. In this case, the first type excitation is caused by the first excitation light emitted from the first excitation generator.

A second type excitation of at least one kind of rear-earth ions is another transition from the excited state absorption lower level to a high excited level which is equal to or higher than the laser upper level. The second type excitation is to a void an undesired transition of at least one kind of rear-earth ions from the excited state absorption lower level to the excited state absorption upper level and also avoid another undesired transition of at least one kind of rear-earth ions from the excited state absorption lower level to the ground level. Avoidance or suppression of the undesired transitions avoids or suppresses the undesired or unintended appearance of the signal light excited state absorption. In order to avoid these undesired transitions of at least one kind of rear-earth ions from the excited state absorption lower level or avoid the undesired or unintended appearance of the signal light excited state absorption, the second excitation generator is provided for exciting at least one kind of rear-earth ions at the excited state absorption lower level to the high excited level which is equal to or higher than the laser upper level.

The second type excitation is caused by the second excitation generator. The second excitation generator should not be limited to any particular device, but may typically and preferably comprise the second excitation light emitted from the second excitation generator. In this case, the second type excitation is caused by the second excitation light emitted from the second excitation generator.

Emission transitions from the laser upper level to the laser lower level are the intended transitions for emitting lights with an intended wavelength band. A remaining emission transition of at least one kind of rear-earth ions from the laser upper level to the excited state absorption lower level is unintended and undesired because this emission transition causes undesired multiplication of the transitions of at least one kind of rear-earth ions to the undesired excited state absorption lower level.

As described above, however, the second excitation generator is provided for exciting the at least one kind of rear-earth ions at the undesired excited state absorption lower level up to the high excited level which is equal to or higher than the laser upper level, in order to avoid the above-described undesired transitions or the undesired or unintended appearance of the signal light excited state absorption.

It is important for avoiding or suppressing the undesired or unintended appearance of the signal light excited state absorption that the optical amplifier includes not only the first excitation generator for causing the population inversion between the laser upper level and the laser lower level, but also the second excitation generator for exciting the at least one kind of rear-earth ions at the undesired excited state absorption lower level up to the high excited level which is equal to or higher than the laser upper level, in order to avoid the above-described undesired transitions or the undesired or unintended appearance of the signal light excited state absorption.

The amplifier medium may be configured in a form of an optical fiber waveguide, and the optical amplifier may be configured in a form of an optical fiber laser. In this case, the amplifier medium may comprise a fluorozirconate glass doped with erbium ions. A base material of the amplifier medium may comprise a fluorozirconate glass. The at least one kind of rare-earth ions may comprise erbium ions. In this case, the laser upper level includes at least one of $^4S_{3/2}$, and $^2H_{11/2}$, and the laser lower level includes $^4I_{9/2}$, the excited state absorption lower level includes $^4I_{3/2}$, and the excited state absorption upper level includes $^4I_{9/2}$.

It is preferable that the first excitation generator generates at least one of first type excitation lights, which are ranged in wavelength from 960 nanometers to 985 nanometers, and which cause the first type excitation. The second excitation generator generates at least one of second type excitation lights, are ranged in wavelength from 780 nanometers to 790 nanometers, and which cause the first second type excitation.

Also, the first excitation generator generates at least one of first type excitation lights, which are ranged in wavelength from 795 nanometers to 805 nanometers, and which cause the first type excitation. The second excitation generator generates at least one of second type excitation lights, are ranged in wavelength from 780 nanometers to 790 nanometers, and which cause the first second type excitation.

As shown in FIG. 1, a first type excitation of erbium ions is a transition to cause a population inversion between the laser upper level ($^4S_{3/2}$, and $^2H_{11/2}$) and the laser lower level ($^4I_{9/2}$). The first type excitation may, for example, include first to third transitions (a, a', a"). The first type excitation is caused by the first excitation generator. The first excitation generator should not be limited to any particular device, but may typically and preferably comprise the first excitation light emitted from the first excitation light source. In this case, the first type excitation is caused by the first excitation light emitted from the first excitation light source.

A second type excitation of erbium ions is another transition from the excited state absorption lower level ($^4I_{13/2}$) to a high excited level which is equal to or higher than the laser upper level ($^4S_{3/2}$, and $^2H_{11/2}$), wherein the high excited level may be $^4S_{3/2}$, $^2H_{11/2}$ or $^4F_{7/2}$-level. The second type excitation is to avoid an undesired transition (f) of erbium ions from the excited state absorption lower level ($^4I_{13/2}$) to the excited state absorption upper level ($^4I_{9/2}$) and also avoid another undesired transition (g) of erbium ions from the excited state absorption lower level ($^4I_{13/2}$) to the ground level ($^4I_{15/2}$). Avoidance or suppression of the undesired transitions (f and g) avoids or suppresses the undesired or unintended appearance of the signal light excited state absorption. In order to avoid these undesired transitions of erbium ions from the excited state absorption lower level ($^4I_{13/2}$) or avoid the undesired or unintended appearance of the signal light excited state absorption, the second excitation generator is provided for exciting erbium ions at the excited state absorption lower level ($^4I_{13/2}$) to the high excited level which is equal to or higher than the laser upper level ($^4S_{3/2}$, and $^2H_{11/2}$). The second type excitation may, for example, include fourth to sixth transitions (b, b', b"). The second type excitation is caused by the second excitation generator. The second excitation generator should not be limited to any particular device, but may typically and preferably comprise the second excitation light emitted from the second excitation light source. In this case, the second type excitation is caused by the second excitation light emitted from the second excitation light source.

FIG. 1 also shows emission transitions (e, d) from the laser upper level ($^4S_{3/2}$, and $^2H_{11/2}$) to the laser lower level ($^4I_{9/2}$). These emission transitions (e, d) are the intended transitions for emitting lights with an intended wavelength band from 1620 nm to 1740 nm. Each of the emission transitions (e, d) has a broad in wavelength because each of the energy levels ($^4S_{3/2}$, and $^2H_{11/2}$) comprises each very narrow energy band in precise perspectives. Each of the excited energy levels higher than the ground level comprises each very narrow energy band in precise perspectives, even for convenience each of the energy levels is presented by a single horizontal line. A remaining emission transition (c) of erbium ions from the laser upper level ($^4S_{3/2}$) to the excited state absorption lower level ($^4I_{13/2}$) is unintended and undesired because this emission transition (c) causes undesired multiplication of the transitions of erbium ions to the undesired excited state absorption lower level ($^4I_{13/2}$).

As described above, however, the second excitation generator is provided for exciting the erbium ions at the undesired excited state absorption lower level ($^4I_{13/2}$) up to the high excited level which is equal to or higher than the laser upper level ($^4S_{3/2}$, and $^2H_{11/2}$), in order to avoid the above-described undesired transitions (f and g) or the undesired or unintended appearance of the signal light excited state absorption.

It is important for avoiding or suppressing the undesired or unintended appearance of the signal light excited state absorption that the optical amplifier includes not only the first excitation generator for causing the population inversion between the laser upper level ($^4S_{3/2}$, and $^2H_{11/2}$) and the laser lower level ($^4I_{9/2}$), but also the second excitation generator for exciting the erbium ions at the undesired excited state absorption lower level ($^4I_{13/2}$) up to the high excited level which is equal to or higher than the laser upper level ($^4S_{3/2}$, and $^2H_{11/2}$), in order to avoid the above-described undesired transitions (f and g) or the undesired or unintended appearance of the signal light excited state absorption.

It is preferable that the optical amplifier includes plural optical amplifier units coupled in series with each other, and wherein each of the plural optical amplifier units further includes the amplifier medium, the first excitation generator and the second excitation generator. This configuration may be effective to realize a higher gain and a higher efficiency of the signal light amplification as compared to the laser amplifier of the first embodiment. The number of the amplifier units coupled in series should not be limited to two, even this embodiment presents two amplifier units as one typical example. It is, of course, possible that three or more amplifier units are optically coupled in series to form a multi-stage amplifier structure for obtaining a higher gain and a higher efficiency.

Under condition that an excitation light with a predetermined or fixed power can be obtained from the excitation light source, the gain of the amplifier varies depending upon variation of the length of the fiber amplifier. The gain takes a maximum value at an optimum length of the fiber amplifier, and both increase and decrease in the length of the fiber amplifier from the optimum length causes reductions of the gain. In general, the power of the excitation light from the sole excitation light source is finite, for which reason increasing the power of the excitation light by varying the length of the fiber amplifier is limitative. In accordance with this embodiment, the laser amplifier has the multi-stage optical coupling in series of plural amplifier units, each of which includes the fiber amplifier with an optimum length for taking a maximum gain with the limited power of the excitation light from the excitation light source, for realizing a multi-step amplification of the signal light at a high gain and a high efficiency with a reduced power loss of the excitation light.

In the above-configuration of the series coupling of the plural amplifier units, it is further preferable that a cut-off device for cutting off any amplified spontaneous emission light may optionally be interposed between adjacent two of the plural optical amplifier units coupled in series with each other. The cut-off device may, for example, be adopted to cut off at least one of lights ranged in wavelength from 500 nanometers to 560 nanometers and from 820 nanometers to 860 nanometers. It is possible to increase the length of each of the fiber amplifiers respectively included in the plural amplifier units, based on the quantity of the excitation light from the excitation light source. The increase in the length of each of the fiber amplifiers causes an undesired increase in power of the amplified spontaneous emission light. The amplified spontaneous emission light with the increased power suppresses a desired or intended stimulated emission by the signal light. This suppression makes it difficult to obtain a desired high gain of the optical amplifier. That suppression further causes an undesired conversion from the excitation light power to the amplified spontaneous emission light power, resulting in an undesired reduction in an efficiency of an energy conversion from the excitation light to the signal light.

In case of erbium ions, as shown in FIG. 1, the undesired or unintended spontaneous emission transition (c) from the laser upper level ($^4S_{3/2}$) to the excited state absorption lower level ($^4I_{13/2}$) conflicts with the desired or intended stimulated emission transitions (d and e) from the laser upper level ($^4S_{3/2}$, and $^2H_{11/2}$) to the laser lower level ($^4I_{9/2}$) for the amplification process. Namely, the undesired or unintended spontaneous emission transition (c) from the laser upper level ($^4S_{3/2}$) to the excited state absorption lower level ($^4I_{13/2}$) causes the undesired or unintended spontaneous emission light of the 850 nm-wavelength-band which suppresses a desired or intended amplification of the light with a wavelength of 1650 nm. This suppression causes undesired reductions of the gain and the energy conversion efficiency.

In order to avoid the above-described disadvantages, it is effective that the cut-off device for cutting off the undesired amplified spontaneous emission light is interposed between the fiber amplifiers respectively included in the plural amplifier units, so that the cut-off device prevents any excess amplification of the amplified spontaneous emission light in the fiber amplifier on the follower stage, whereby the desired or intended stimulated emission transitions (d and e) from the laser upper level ($^4S_{3/2}$, and $^2H_{11/2}$) to the laser lower level ($^4I_{9/2}$) is dominant over the undesired or unintended spontaneous emission transition (c) from the laser upper level ($^4S_{3/2}$) to the excited state absorption lower level ($^4I_{13/2}$), resulting in a highly efficient energy conversion from the laser upper level ($^4S_{3/2}$, and $^2H_{11/2}$) to the energy of the signal light. This permits realizing the desired high gain and high energy conversion efficiency.

It is also preferable to further include a gain enhancement generator for supplying the amplifier medium with a gain enhancement light with a wavelength which causes that a ratio $S_1/S_2$ of a first cross section $S_1$ of a transition from $^4S_{3/2}$-level to $^4I_{13/2}$-level to a second cross section $S_2$ of a transition from $^4I_{13/2}$-level to $^4S_{3/2}$-level is ranged from 0.2 to 2.2.

It is also preferable that (D×L)/(S×P) is ranged from 1 to 10, where D is a concentration (ppm) of the erbium ions, L is an interaction length (m) between the amplifier medium and excitation light, S is an interaction cross section ($\mu m^2$) between the amplifier medium and excitation lights, and P is a total power (mW) of the first type excitation light and the second type excitation light which are incident into the amplifier medium.

A second aspect of the present invention is an optical amplifier including: an optical fiber waveguide, a first excitation generator, and a second excitation generator. The optical fiber waveguide comprises an amplifier medium which further comprises a fluorozirconate glass doped with erbium ions having an energy level system which includes: a ground level; a first pair of a laser upper level and a laser lower level which is higher than the ground level and lower than the laser upper level; and a second pair of an excited state absorption upper level, and an excited state absorption lower level which is lower than the excited state absorption upper level, wherein the second pair allows absorbing an emission light generated by a transition from the laser upper level to the laser lower level, and wherein the excited state absorption lower level is higher than the ground level and lower than the laser upper level, and wherein the excited state absorption lower level is different from the laser lower level.

The first excitation generator generates at least one of first type excitation lights which cause a first type excitation of the erbium ions to cause a population inversion between the laser upper level and the laser lower level. The second excitation generator generates at least one of second type excitation lights which cause a second type excitation of the erbium ions from the excited state absorption lower level to a high excited level which is equal to or higher than the laser upper level, wherein the second type excitation lights are different in wavelength from the first type excitation lights.

A third aspect of the present invention is a method of operating an optical amplifier which includes: an amplifier medium allowing a propagation of a signal light which is subject to an amplification. The amplifier medium is doped with at least one kind of rare-earth ions. Each of the at least one kind of rare-earth ions has an energy level system which includes: a ground level; a first pair of a laser upper level and a laser lower level which is higher than the ground level and lower than the laser upper level; and a second pair of an excited state absorption upper level, and an excited state absorption lower level which is lower than the excited state absorption upper level, wherein the second pair allows absorbing an emission light generated by a transition from the laser upper level to the laser lower level, and wherein the excited state absorption lower level is higher than the ground level and lower than the laser upper level, and wherein the excited state absorption lower level is different from the laser lower level.

The method includes: causing a first type excitation of the at least one kind of rare-earth ions to cause a population inversion between the laser upper level and the laser lower level; and causing a second type excitation of the at least one kind of rare-earth ions from the excited state absorption lower level to a high excited level which is equal to or higher than the laser upper level.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Preferred Embodiments

Figure 2:
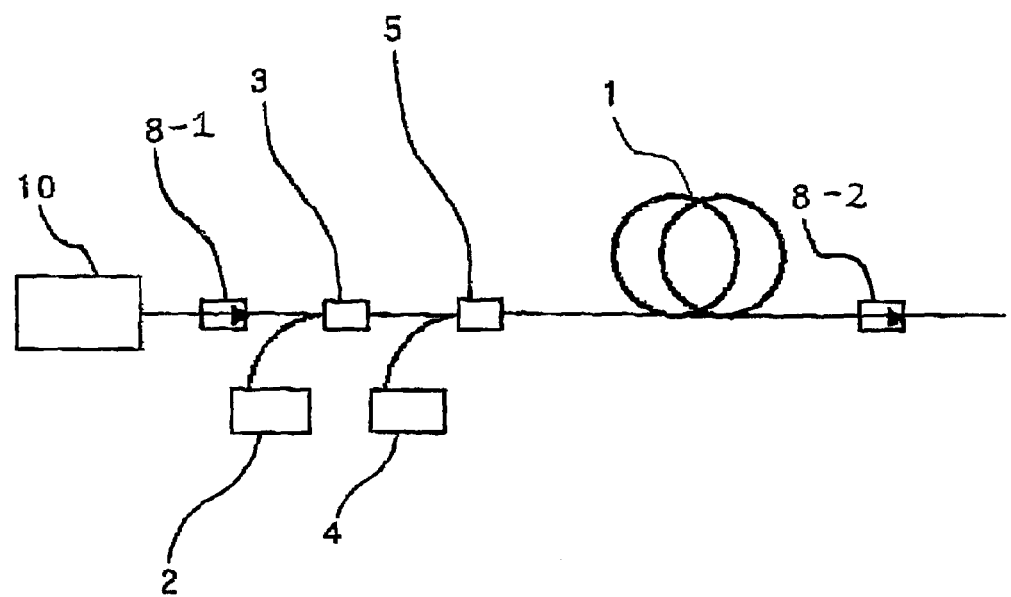
FIG. 2 is a schematic view illustrative of a laser amplifier in a first embodiment in accordance with the present invention.

First Embodiment:

A first embodiment according to the present invention will be described in detail with reference to the drawings. FIG. 1 is a diagram illustrative of energy levels of erbium ions in a medium. Energy levels of erbium ions are unique to erbium and independent from a base material of the medium. FIG. 2 is a schematic view illustrative of a configuration of a laser amplifier in a first embodiment in accordance with the present invention. Descriptions of the configuration of the laser amplifier of this embodiment will be described, prior to detailed descriptions of the energy levels of erbium ions with reference to FIG. 1.

As shown in FIG. 2, the laser amplifier may include a signal light source 10 for emitting a signal light, a first excitation light source 2 for generating a first excitation light, a first wavelength multiplexer 3 for multiplexing the first excitation light to the signal light, a second excitation light source 4 for generating a second excitation light, a second wavelength multiplexer 5 for multiplexing the second excitation light to the signal light, and a fiber amplifier 1 comprising an amplifier medium for amplifying the signal light.

The signal light source 10 is capable of varying a wavelength of the emission signal light. An emission side of the signal light source 10 is optically coupled through a series connection of the first and second wavelength multiplexers 3 and 5 to the fiber amplifier 1. The emission signal light from the signal light source 10 is transmitted to the fiber amplifier 1. The first wavelength multiplexer 3 is positioned closer to the emission side of the signal light source 10 than the second wavelength multiplexer 5. The second wavelength multiplexer 5 is positioned closer to the fiber amplifier 1 than the first wavelength multiplexer 3. The first wavelength multiplexer 3 is optically coupled to the first excitation light source 2 for multiplexing the signal light with the first excitation light emitted from the first excitation light source 2. The second wavelength multiplexer 5 is optically coupled to the second excitation light source 4 for multiplexing the signal light with the second excitation light emitted from the second excitation light source 4. Namely, the signal light is first multiplexed with the first excitation light by the first wavelength multiplexer 3 and then multiplexed with the second excitation light by the second wavelength multiplexer 5 prior to the transmission or propagation through the fiber amplifier 1.

A first optical isolator 8-1 is optionally and preferably interposed between the signal light source 10 and the first wavelength multiplexer 3. Also, a second optical isolator 8-2 is optionally and preferably provided in an emission side or an output side of the fiber amplifier 1. The first and second optical isolators 8-1 and 8-2 suppress any unintended or undesired laser emission due to an unintended or undesired reflected light.

The fiber amplifier 1 comprises an amplifier medium which comprises a base material doped with at least one kind of rear-earth ions, provided that each of the at least one kind of rear-earth ions has each unique energy level system which includes a ground level, a first pair of a laser upper level and a laser lower level which is higher than the ground level and lower than the laser upper level, and a second pair of an excited state absorption upper level and an excited state absorption lower level which is lower than the excited state absorption upper level, wherein the second pair allows absorbing an emission light generated by a transition from the laser upper level to the laser lower level, and wherein the excited state absorption lower level is higher than the ground level and lower than the laser upper level, and the excited state absorption lower level is also different from the laser lower level.

If the amplifier medium comprises the base material doped with plural kinds of rear-earth ions, then it is necessary that each of the plural kinds of rear-earth ions has each unique energy level system which satisfy the above-described conditions, wherein respective unique energy level systems of the plural kinds of rear-earth ions are simply superimposed to each other, with reference to the ground level as a common or basic level, but without changing the each unique energy level system itself. In this case, the laser upper level comprise one or plural energy levels which are unique to the plural kinds of rear-earth ions. Also, the laser lower level comprise one or plural energy levels which are unique to the plural kinds of rear-earth ions. Also, the excited state absorption lower level comprise one or plural energy levels which are unique to the plural kinds of rear-earth ions. Also, the excited state absorption upper level comprise one or plural energy levels which are unique to the plural kinds of rear-earth ions.

In accordance with a simple and typical example, the base material may preferably comprise a fluorozirconate glass, while the rear-earth ions may also preferably comprise erbium ions. Namely, the amplifier medium may preferably comprise a fluorozirconate glass doped with erbium ions ($Er^{3+}$).

Erbium has a unique energy level system as shown in FIG. 1. Erbium ion has a ground level ($^4I_{15/2}$), a laser upper level ($^4S_{3/2}$, and $^2H_{11/2}$), a laser lower level ($^4I_{9/2}$), an excited state absorption upper level ($^4I_{9/2}$), and an excited state absorption lower level ($^4I_{13/2}$). The laser upper level ($^4S_{3/2}$, and $^2H_{11/2}$) is higher than the laser lower level ($^4I_{9/2}$). The excited state absorption upper level ($^4I_{9/2}$) is higher than the excited state absorption lower level ($^4I_{13/2}$). The excited state absorption lower level ($^4I_{13/2}$) is higher than the ground level ($^4I_{15/2}$) and lower than the laser upper level ($^4S_{3/2}$, and $^2H_{11/2}$). The excited state absorption lower level ($^4I_{13/2}$) is also different from the laser lower level ($^4I_{9/2}$). Energy levels ($^4S_{3/2}$) and ($^2H_{11/2}$) are thermally coupled with each other. A population inversion is caused between the laser upper level ($^4S_{3/2}$, and $^2H_{11/2}$) and the laser lower level ($^4I_{9/2}$). A pair of the excited state absorption upper level ($^4I_{9/2}$) and the excited state absorption lower level ($^4I_{13/2}$) allows absorbing an emission light generated by a transition generated by a transition from the laser upper level ($^4S_{3/2}$, and $^2H_{11/2}$) to the laser lower level ($^4I_{9/2}$). Consequently, erbium ion has the energy level system which satisfy the above described conditions for the energy level system.

The above fiber amplifier 1 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1 should not be limited but a typical example thereof may be 5.2 meters.

FIG. 1 also shows the following transitions. A first type excitation of erbium ions is a transition to cause a population inversion between the laser upper level ($^4S_{3/2}$, and $^2H_{11/2}$) and the laser lower level ($^4I_{9/2}$). The first type excitation may, for example, include first to third transitions (a, a', a"). The first type excitation is caused by the first excitation generator. The first excitation generator should not be limited to any particular device, but may typically and preferably comprise the first excitation light emitted from the first excitation light source 2. In this case, the first type excitation is caused by the first excitation light emitted from the first excitation light source 2.

A second type excitation of erbium ions is another transition from the excited state absorption lower level ($^4I_{13/2}$) to a high excited level which is equal to or higher than the laser upper level ($^4S_{3/2}$, and $^2H_{11/2}$), wherein the high excited level may be $^4S_{3/2}$, $^2H_{11/2}$ or $^4F_{7/2}$-level. The second type excitation is to avoid an undesired transition (f) of erbium ions from the excited state absorption lower level ($^4I_{13/2}$) to the excited state absorption upper level ($^4I_{9/2}$) and also avoid another undesired transition (g) of erbium ions from the excited state absorption lower level ($^4I_{13/2}$) to the ground level ($^4I_{15/2}$). Avoidance or suppression of the undesired transitions (f and g) avoids or suppresses the undesired or unintended appearance of the signal light excited state absorption. In order to avoid these undesired transitions of erbium ions from the excited state absorption lower level ($^4I_{13/2}$) or avoid the undesired or unintended appearance of the signal light excited state absorption, the second excitation generator is provided for exciting erbium ions at the excited state absorption lower level ($^4I_{13/2}$) to the high excited level which is equal to or higher than the laser upper level ($^4S_{3/2}$, and $^2H_{11/2}$). The second type excitation may, for example, include fourth to sixth transitions (b, b', b"). The second type excitation is caused by the second excitation generator. The second excitation generator should not be limited to any particular device, but may typically and preferably comprise the second excitation light emitted from the second excitation light source 4. In this case, the second type excitation is caused by the second excitation light emitted from the second excitation light source 4.

FIG. 1 also shows emission transitions (e, d) from the laser upper level ($^4S_{3/2}$, and $^2H_{11/2}$) to the laser lower level ($^4I_{9/2}$). These emission transitions (e, d) are the intended transitions for emitting lights with an intended wavelength band from 1620 nm to 1740 nm. Each of the emission transitions (e, d) has a broad in wavelength because each of the energy levels ($^4S_{3/2}$, and $^2H_{11/2}$) comprises each very narrow energy band in precise perspectives. Each of the excited energy levels higher than the ground level comprises each very narrow energy band in precise perspectives, even for convenience each of the energy levels is presented by a single horizontal line. A remaining emission transition (c) of erbium ions from the laser upper level ($^4S_{3/2}$) to the excited state absorption lower level ($^4I_{13/2}$) is unintended and undesired because this emission transition (c) causes undesired multiplication of the transitions of erbium ions to the undesired excited state absorption lower level ($^4I_{13/2}$).

As described above, however, the second excitation generator is provided for exciting the erbium ions at the undesired excited state absorption lower level ($^4I_{13/2}$) up to the high excited level which is equal to or higher than the laser upper level ($^4S_{3/2}$, and $^2H_{11/2}$), in order to avoid the above-described undesired transitions (f and g) or the undesired or unintended appearance of the signal light excited state absorption.

It is important for avoiding or suppressing the undesired or unintended appearance of the signal light excited state absorption that the optical amplifier includes not only the first excitation generator for causing the population inversion between the laser upper level ($^4S_{3/2}$, and $^2H_{11/2}$) and the laser lower level ($^4I_{9/2}$), but also the second excitation generator for exciting the erbium ions at the undesired excited state absorption lower level ($^4I_{13/2}$) up to the high excited level which is equal to or higher than the laser upper level ($^4S_{3/2}$, and $^2H_{11/2}$), in order to avoid the above-described undesired transitions (f and g) or the undesired or unintended appearance of the signal light excited state absorption.

As described above, the typical example of the first excitation generator may comprise the first excitation light source 2 which generates and emits a first type excitation light which further causes a ground state absorption and/or a combination of the ground state absorption with an excited state absorption, whereby erbium ions are excited to the high excited level which is equal to or higher than the laser upper level ($^4S_{3/2}$, and $^2H_{11/2}$), wherein the high excited level may be $^4S_{3/2}$, $^2H_{11/2}$ or $^4F_{7/2}$-level. If erbium ions are excited to the energy level ($^4F_{7/2}$), then the excited erbium ions show phonon-relaxation to the laser upper level ($^4S_{3/2}$, and $^2H_{11/2}$). This first type excitation from the ground level ($^4I_{15/2}$) to the high excited level causes the population inversion between the laser upper level ($^4S_{3/2}$, and $^2H_{11/2}$) and the laser lower level ($^4I_{9/2}$). The population inversion causes the above-described intended emission transitions (e and d) from the laser upper level ($^4S_{3/2}$, and $^2H_{11/2}$) to the laser lower level ($^4I_{9/2}$).

Typical examples of the first type excitation light may include a 530 nm-band light with a wavelength band of 510 nm to 550 nm, a 800 nm-band light with a wavelength band of 780 nm to 810 nm, and a 970 nm-band light with a wavelength band of 960 nm to 985 nm. The 530 nm-band light is used to cause the first transition (a) from the ground level ($^4I_{15/2}$) to the laser upper level ($^2H_{11/2}$). The 970 nm-band light is used to cause the second transition (a') from the ground level ($^4I_{15/2}$) to the higher energy level ($^4F_{7/2}$). The 800 nm-band light is used to cause the third transition (a") from the ground level ($^4I_{15/2}$) to the laser upper level ($^2H_{11/2}$). In FIG. 1, wavy line arrow marks represent multi-phonon relaxation.

As described above, the typical example of the second excitation generator may comprise the second excitation light source 4 which generates and emits a second type excitation light which further causes the excited state absorption, whereby erbium ions are excited from the excited state absorption lower level ($^4I_{13/2}$) to the high excited level which is equal to or higher than the laser upper level ($^4S_{3/2}$, and $^2H_{11/2}$), wherein the high excited level may be $^4S_{3/2}$, $^2H_{11/2}$ or $^4F_{7/2}$-level. If erbium ions are excited to the energy level ($^4F_{7/2}$), then the excited erbium ions show phonon-relaxation to the laser upper level ($^4S_{3/2}$, and $^2H_{11/2}$). This second type excitation from the excited state absorption lower level ($^4I_{13/2}$) to the high excited level avoids or suppresses the undesired or unintended transitions (f and g) from the excited state absorption lower level ($^4I_{13/2}$) to the laser lower level ($^4I_{9/2}$) and the ground level ($^4I_{15/2}$), or the undesired or unintended appearance of the signal light excited state absorption.

Typical examples of the second type excitation light may include a 720 nm-band light with a wavelength band of 710 nm to 730 nm, a 800 nm-band light with a wavelength band of 780 nm to 810 nm, and a 850 nm-band light with a wavelength band of 830 nm to 870 nm. The 850 nm-band light is used to cause the fourth transition (b) from the excited state absorption lower level ($^4I_{13/2}$) to the laser upper level ($^4S_{3/2}$). The 800 nm-band light is used to cause the fifth transition (b') from the excited state absorption lower level ($^4I_{13/2}$) to the laser upper level ($^2H_{11/2}$). The 720 nm-band light is used to cause the third transition (b") from the excited state absorption lower level ($^4I_{13/2}$) to the higher energy level ($^4F_{7/2}$).

It is possible to select any combination of first one, as the first type excitation light, of the 530 nm-band light (510 nm to 550 nm), the 800 nm-band light (780 nm to 810 nm), and the 970 nm-band light (960 nm to 985 nm) with second one, as the second type excitation light, of the 720 nm-band light (710 nm to 730 nm), the 800 nm-band light (780 nm to 810 nm), and the 850 nm-band light (830 nm to 870 nm).

The first to sixth transitions will be described in more details. The first type excitation light causes one of the first to third transitions (a, a', and a") which are different from each other as shown in FIG. 1.

The process of the first transition (a) is that a single time absorption of a single photon of a 530 nm-band wavelength into erbium ion at the ground level ($^4I_{15/2}$) causes a single time excitation from the ground level ($^4I_{15/2}$) to the laser upper level ($^2H_{11/2}$). The excitation (a) is caused with no energy loss.

The process of the second transition (a') is that a first time absorption of a first photon of a 970 nm-band wavelength into erbium ion at the ground level ($^4I_{15/2}$) causes a first excitation from the ground level ($^4I_{15/2}$) to an excited energy level ($^4I_{11/2}$), and further a second time absorption of a second photon of the 970 nm-band wavelength into erbium ion at the excited energy level ($^4I_{11/2}$) causes a second excitation from the excited energy level ($^4I_{11/2}$) to the high excited level ($^4F_{7/2}$), and then the excited erbium ion at the high excited level ($^4F_{7/2}$) exhibits a phonon relaxation to the laser upper level ($^2H_{11/2}$). A difference in energy between the laser upper level ($^2H_{11/2}$) and the ground level ($^4I_{15/2}$) is slightly smaller than or almost equal to a total energy of two photons of the 970 nm-band wavelength. This means that the excitation (a') of erbium ion is caused accompanying with almost zero energy loss.

The process of the third transition (a") is that a first time absorption of a first photon of a 800 nm-band wavelength into erbium ion at the ground level ($^4I_{15/2}$) causes a first excitation from the ground level ($^4I_{15/2}$) to the excited state absorption upper level ($^4I_{9/2}$), and then the excited erbium ion at the excited state absorption upper level ($^4I_{9/2}$) exhibits multi-phonon relaxation through the excited energy level ($^4I_{11/2}$) to the excited state absorption lower level ($^4I_{13/2}$), before a second time absorption of a second photon of the 800 nm-band wavelength into erbium ion at the excited state absorption lower level ($^4I_{13/2}$) causes a second excitation from the excited state absorption lower level ($^4I_{13/2}$) to the laser upper level ($^2H_{11/2}$). A difference in energy between the laser upper level ($^2H_{11/2}$) and the ground level ($^4I_{15/2}$) is smaller than a total energy of two photons of the 800 nm-band wavelength by a difference in energy between the excited state absorption upper level ($^4I_{9/2}$) and the excited state absorption lower level ($^4I_{11/2}$). The excitation (a") is caused with a thermal energy loss due to the multi-phonon relaxation, which corresponds to the difference in energy between the excited state absorption upper level ($^4I_{9/2}$) and the excited state absorption lower level ($^4I_{11/2}$), for example, approximately 24 percents energy loss.

In view of avoiding an energy loss in the excitation process, the 530 nm-band light and the 970 nm-band light are more preferable than the 800 nm-band light.

Notwithstanding, a relatively preferable wavelength narrow band is present for the 800 nm-band light in the following points of view.

Figure 3:
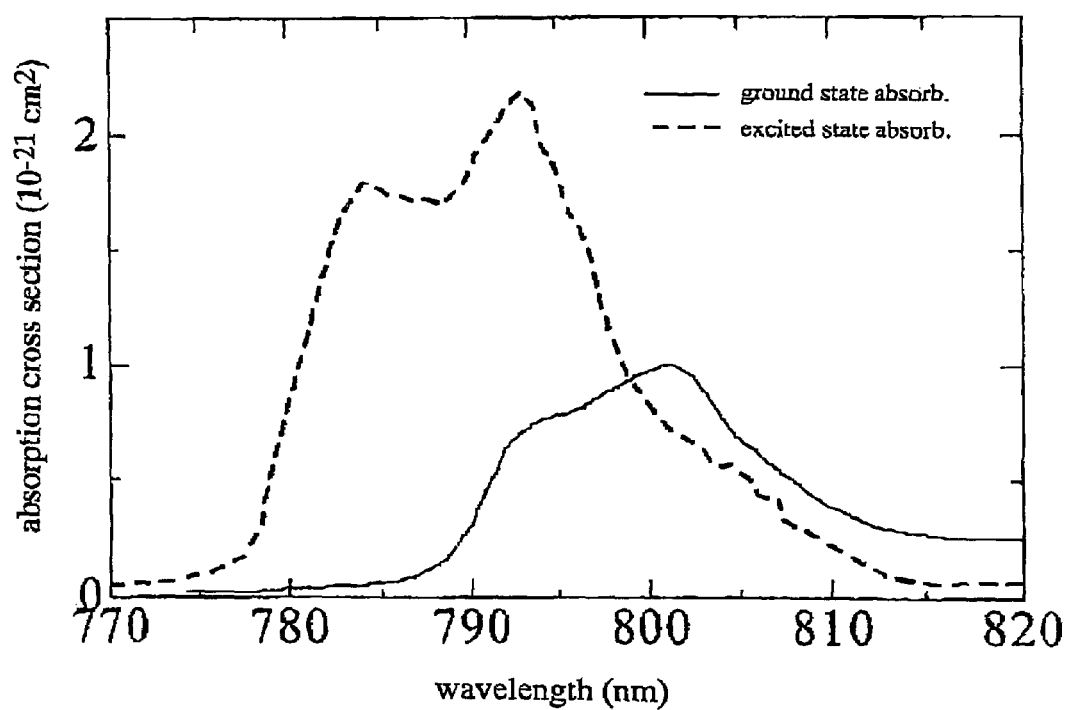
FIG. 3 is a diagram illustrative of variations of a ground state absorption cross section and an excited state absorption cross section over wavelength.

FIG. 3 is a diagram illustrative of variations of a ground state absorption cross section and an excited state absorption cross section over wavelength. A real line represents the ground state absorption cross section. A broken line represents the excited state absorption cross section. The ground state absorption causes the first time transition from the ground level ($^4I_{15/2}$) to the excited state absorption upper level ($^4I_{9/2}$). The excited state absorption causes the second time transition from the excited state absorption lower level ($^4I_{13/2}$) to the laser upper level ($^2H_{11/2}$).

The transition (a") is the two-steps transition or an up-conversion transition which comprises the ground state absorption transition at the 800 nm-band from the ground level ($^4I_{15/2}$) to the excited state absorption upper level ($^4I_{9/2}$), and the excited state absorption transition at the 800 nm-band from the excited state absorption lower level ($^4I_{13/2}$) to the laser upper level ($^2H_{11/2}$). It is important for realizing this up-conversion transition at a high efficiency to obtain sufficiently high values of both the ground state absorption cross section and the excited state absorption cross section. A lower one of the ground state absorption cross section and the excited state absorption cross section provides a limitation to the efficiency of the up-conversion transition. For example, if one of the ground state absorption cross section and the excited state absorption cross section is large and another is too small, then this makes it difficult to realize the up-conversion at a desired high efficiency. It is, therefore, desired for realizing this up-conversion transition at a high efficiency to take a possible large value for smaller one of the ground state absorption cross section and the excited state absorption cross section.

Figure 4:
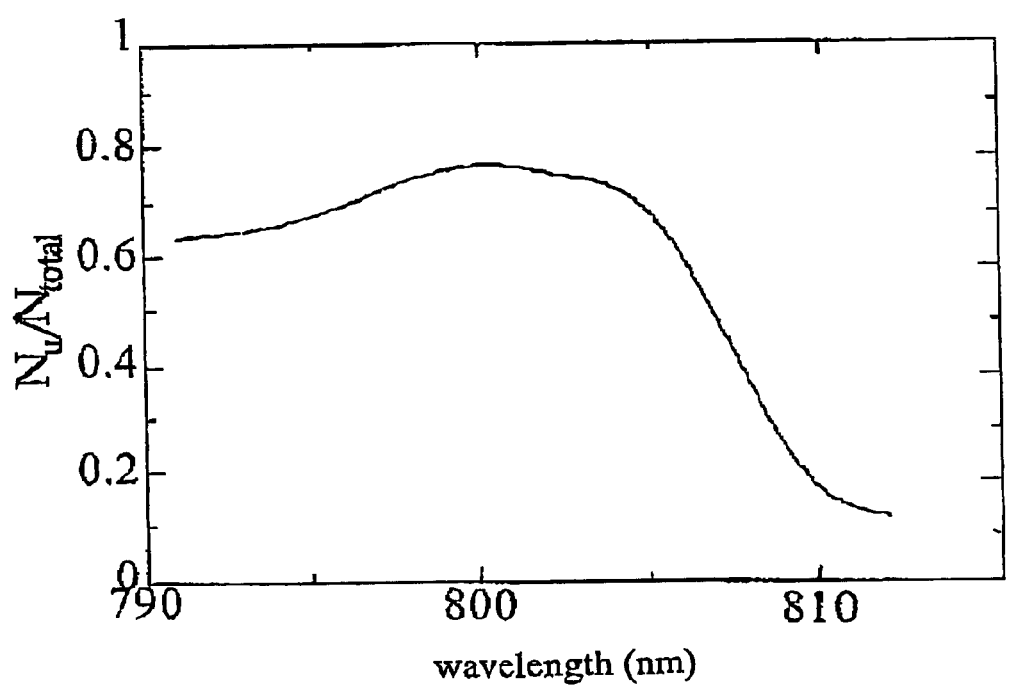
FIG. 4 is a diagram illustrative of a variation in an efficiency of an excitation to a laser upper level over wavelength.

FIG. 4 is a diagram illustrative of a variation in an efficiency of an excitation to a laser upper level over wavelength. The efficiency of the excitation to the laser upper level over wavelength can be obtained by calculating $N_u/N_{total}$ over wavelength by use of the ground state absorption cross section and the excited state absorption cross section shown in FIG. 3. $N_u$ represents the number of erbium ions at the laser upper level ($^4S_{3/2}$, and $^2H_{11/2}$). $N_{total}$ represents the total number of erbium ions. The efficiency ($N_u/N_{total}$) of the excitation to the laser upper level shown in FIG. 4 was calculated under conditions that a concentration of erbium ions in the amplifier medium is 2000 ppm, the fiber length is 5.2 meters, and excitations at respective wavelengths are caused at an optical power of 100 mW.

For the 800 nm-band first type excitation light, a wavelength band of 795 nm to 805 nm is preferable for realizing a high efficiency of the first type excitation from the ground level ($^4I_{15/2}$) to the laser upper level ($^4S_{3/2}$, and $^2H_{11/2}$). At a wavelength of 801 nm, the maximum efficiency of the first type excitation is obtained.

Descriptions will focus on a preferable wavelength band of the second type excitation light for causing the second type excitation from the excited state absorption lower level ($^4I_{13/2}$) to the high excited level which is equal to or higher than the laser upper level ($^4S_{3/2}$, and $^2H_{11/2}$).

The second type excitation light causes one of the fourth to sixth transitions (b, b', and b") which are different from each other as shown in FIG. 1.

The process of the fourth transition (b) is that a single time absorption of a single photon of a 850 nm-band wavelength into erbium ion at the excited state absorption lower level ($^4I_{13/2}$) causes a single time excitation from the excited state absorption lower level ($^4I_{13/2}$) to the laser upper level ($^4S_{3/2}$). The excitation (b) is caused with no energy loss.

The process of the fifth transition (b') is that a single time absorption of a single photon of a 800 nm-band wavelength into erbium ion at the excited state absorption lower level ($^4I_{13/2}$) causes a single time excitation from the excited state absorption lower level ($^4I_{13/2}$) to the laser upper level ($^2H_{11/2}$). The excitation (b') is caused with no energy loss.

The process of the sixth transition (b") is that a single time absorption of a single photon of a 720 nm-band wavelength into erbium ion at the excited state absorption lower level ($^4I_{13/2}$) causes a single time excitation from the excited state absorption lower level ($^4I_{13/2}$) to the higher energy level ($^4F_{7/2}$), and then the excited erbium ion at the higher energy level ($^4F_{7/2}$) exhibits a phonon relaxation from the higher energy level ($^4F_{7/2}$) to the laser upper level ($^2H_{11/2}$). The excitation (b") is caused with an energy loss due to the phonon relaxation. In view of avoiding an energy loss in the excitation process, the 850 nm-band light and the 800 nm-band light are more preferable than the 720 nm-band light.

For the wavelength of the second type excitation light, it is preferable for realizing a high efficiency of the excited state absorption with a laser power to select a wavelength of the second type excitation light in view that the excited state absorption cross section is large, while the ground state absorption cross section is small. In accordance with this point of view, the preferable wavelength band of the second type excitation light is 785 nm-band, for example, from 780 nm to 790 nm as shown in FIG. 3.

The above-described first type and second type excitation lights may be obtained by any available light sources which are capable of generating and emitting the excitations lights having the above-described wavelength bands. Typical examples of the available excitation light sources may include, but not limited to, a semiconductor laser, a solid state laser, a gas laser.

The semiconductor laser has often been used for emitting the excitation light which is to be incident into the fiber amplifier. Generally, the semiconductor laser is more superior than the other lasers in view of high efficiency, size reduction, long life-time, and laser output stability.

Figure 5:
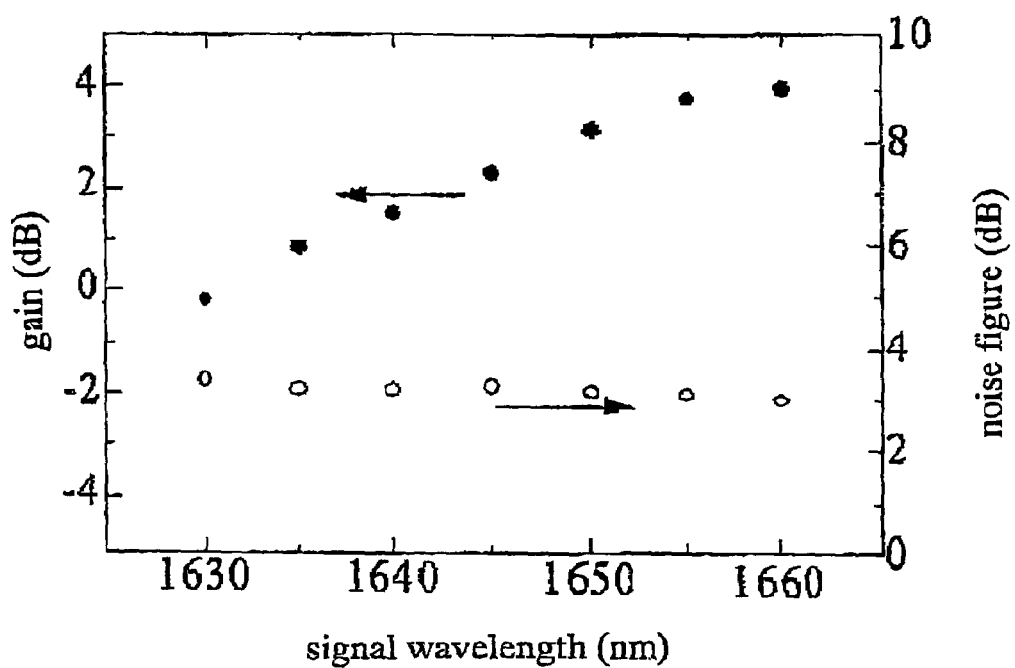
FIG. 5 is a diagram illustrative of variations of gain and noise figure over wavelength of signal light for the laser amplifier shown in FIG. 2.

FIG. 5 is a diagram illustrative of variations of gain and noise figure over wavelength of signal light for the laser amplifier shown in FIG. 2. Measurements to gain and noise figure over wavelength of signal light were made under the following conditions. The first excitation light source 2 emits a first excitation light with a wavelength of 970 nm at an output power of 37 mW. The second excitation light source 4 emits a second excitation light with a wavelength of 789 nm at an output power of 180 mW. The signal light source 10 is swept at a power of −35 dBm in a wavelength band from 1630 nm to 1660 nm. Measured spectrums of the gain and the noise figure are as shown in FIG. 5. ● represents the measured gains. ○ represents the measured noise figure. At the wavelength of 1660 nm of the signal light, the gain is 4 dB and the noise figure is 3 dB. The increase in the wavelength of the signal light increases the gain and slightly decreases the noise figure.

Under the above-described conditions, a figure-of-merit (FOM) was calculated to be approximately 3, wherein FOM=(D×L)/(S×P), where D is a concentration (ppm) of erbium ions, L is an interaction length (m) between the amplifier medium and excitation light, S is an interaction cross section ($\mu m^2$) between the amplifier medium and excitation light, and P is a total power (mW) of the first type excitation light and the second type excitation light which are incident into the amplifier medium.

Figure 6:
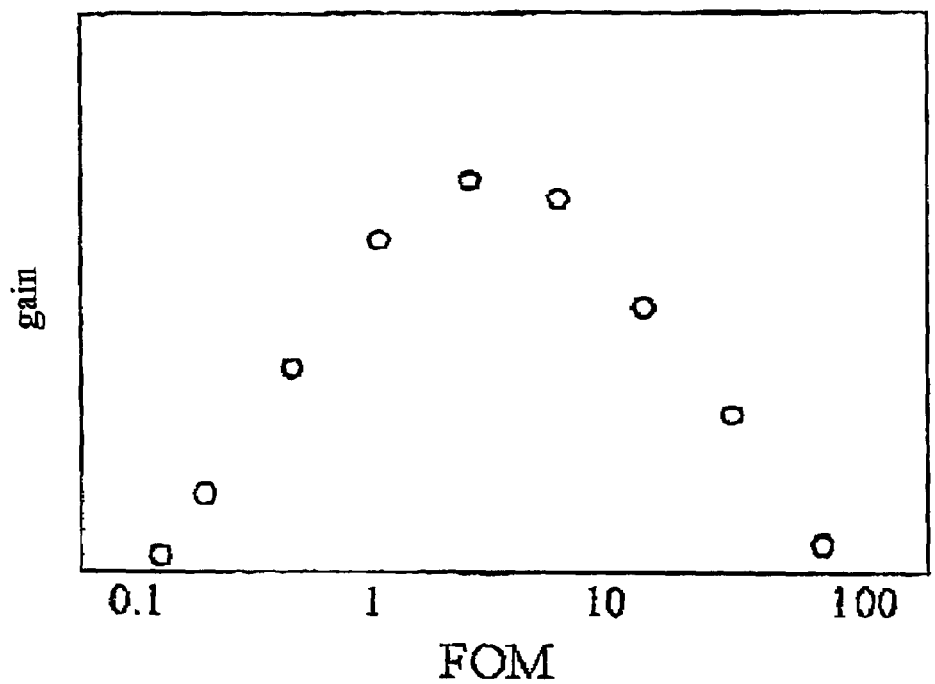
FIG. 6 is a diagram illustrative of a variation of gain over FOM values for the laser amplifier shown in FIG. 2.

FIG. 6 is a diagram illustrative of a variation of gain over FOM values for the laser amplifier shown in FIG. 2. Variations of FOM values are caused by varying the output power of the second type excitation light emitted from the second excitation light source 4 included in the laser amplifier shown in FIG. 2. The gain takes high values in the range of FOM from 1 to 10, and takes a maximum value at FOM of approximately 3. Namely, the preferable FOM is ranged from 1 to 10 for obtaining the high gain.

With reference again to FIG. 2, the first and second excitation light sources 2 and 4 of the laser amplifier are so configured that the first and second excitation lights emitted from the first and second excitation light sources 2 and 4 are propagated through the fiber amplifier 1 in a forward direction, along which the signal light emitted from the signal light source 10 is propagated.

A typical example of modification to the configuration of the first and second excitation light sources 2 and 4 in the laser amplifier may be that at least any one of the first and second excitation light sources 2 and 4 is provided in the emission side of the fiber amplifier 1, so that at least one of the first type and second type excitation lights emitted from the at least one of the first and second excitation light sources 2 and 4 is propagated in an opposite direction to the propagation direction of the signal light.

Another typical example of modification to the configuration of the first and second excitation light sources 2 and 4 in the laser amplifier may be that at least any one of the first and second excitation light sources 2 and 4 is provided in opposite sides of the fiber amplifier 1, so that at least one of the first type and second type excitation lights emitted from the at least one of the first and second excitation light sources 2 and 4 is bidirectionally propagated, for example, in the same direction as the signal light propagation and in the opposite direction to the signal light propagation.

Figure 7:
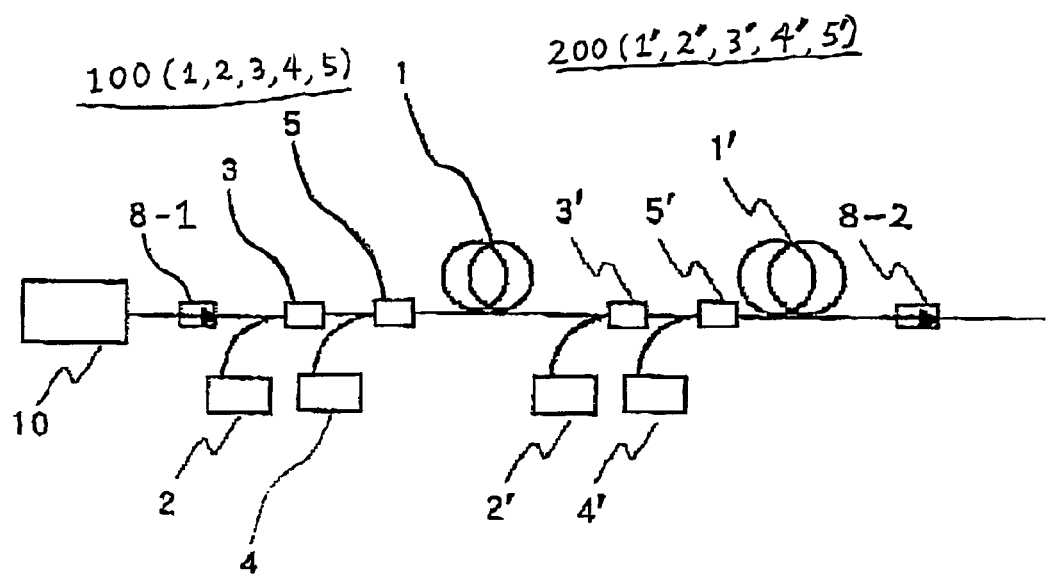
FIG. 7 is a schematic view illustrative of a configuration of a laser amplifier in a second embodiment in accordance with the present invention.

Second Embodiment:

A second embodiment according to the present invention will be described in detail with reference to the drawings. FIG. 7 is a schematic view illustrative of a configuration of a laser amplifier in a second embodiment in accordance with the present invention. The following descriptions will focus on differences of this embodiment from the above-described first embodiment in order to avoid substantially duplications of the descriptions thereof.

The laser amplifier may include a signal light source 10 for emitting a signal light, and a series connection of a first amplifier unit 100 (1, 2, 3, 4, and 5) and a second amplifier unit 200 (1', 2', 3', 4', and 5'). A pair of first and second optical isolators 8-1 and 8-2 is provided, wherein the first and second optical isolators 8-1 and 8-2 are positioned at both sides of the series connection of the first and second amplifier units 100 and 200. The first and second amplifier units 100 and 200 have the same structure and configuration.

The first amplifier unit 100 further includes a first excitation light source 2 for generating a first excitation light, a first wavelength multiplexer 3 for multiplexing the first excitation light to the signal light, a second excitation light source 4 for generating a second excitation light, a second wavelength multiplexer 5 for multiplexing the second excitation light to the signal light, and a fiber amplifier 1 comprising an amplifier medium for amplifying the signal light.

The second amplifier unit 200 further includes a first excitation light source 2' for generating the first excitation light, a first wavelength multiplexer 3' for multiplexing the first excitation light to the signal light, a second excitation light source 4' for generating the second excitation light, a second wavelength multiplexer 5' for multiplexing the second excitation light to the signal light, and a fiber amplifier 1' comprising the amplifier medium for amplifying the signal light.

In the above-described first embodiment, the laser amplifier has the single amplifier unit. In this second embodiment, the laser amplifier has the series connection of the two amplifier units which are directly coupled to each other for realizing a higher gain and a higher efficiency of the signal light amplification as compared to the laser amplifier of the first embodiment. The number of the amplifier units coupled in series should not be limited to two, even this embodiment presents two amplifier units as one typical example. It is, of course, possible that three or more amplifier units are optically coupled in series to form a multi-stage amplifier structure for obtaining a higher gain and a higher efficiency.

Under condition that an excitation light with a predetermined or fixed power can be obtained from the excitation light source, the gain of the amplifier varies depending upon variation of the length of the fiber amplifier. The gain takes a maximum value at an optimum length of the fiber amplifier, and both increase and decrease in the length of the fiber amplifier from the optimum length causes reductions of the gain. In general, the power of the excitation light from the sole excitation light source is finite, for which reason increasing the power of the excitation light by varying the length of the fiber amplifier is limitative. In accordance with this embodiment, the laser amplifier has the multi-stage optical coupling in series of plural amplifier units, each of which includes the fiber amplifier with an optimum length for taking a maximum gain with the limited power of the excitation light from the excitation light source, for realizing a multi-step amplification of the signal light at a high gain and a high efficiency with a reduced power loss of the excitation light.

The fiber amplifier 1 included in the first amplifier unit 100 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1 should not be limited but a typical example thereof may be 3.2.

The fiber amplifier 1' included in the second amplifier unit 200 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1' should not be limited but a typical example thereof may be 5.2.

Each of the first excitation light sources 2 and 2' respectively included in the first and second amplifier units 100 and 200 may be realized by a semiconductor laser which emits a laser beam of a 970 nm-wavelength-band from 960 nm to 985 nm. Notwithstanding, the first excitation light sources 2 and 2' may, of course, be realized by any available first type excitation light sources which emit the first type excitation lights as described in the first embodiment.

Each of the second excitation light sources 4 and 4' respectively included in the first and second amplifier units 100 and 200 may be realized by a titanium sapphire laser which emits a laser beam of a 800 nm-wavelength-band from 780 nm to 810 nm. Notwithstanding, the second excitation light sources 4 and 4' may, of course, be realized by any available second type excitation light sources which emit the second type excitation lights as described in the first embodiment.

The signal light source 10 is capable of varying a wavelength of the emission signal light. An emission side of the signal light source 10 is optically coupled to the series connection of the first and second amplifier units 100 and 200. The emission signal light from the signal light source 10 is transmitted to the series connection of the first and second amplifier units 100 and 200. The first amplifier unit 100 is positioned closer to the emission side of the signal light source 10 than the second amplifier unit 200.

In the first amplifier unit 100, the first wavelength multiplexer 3 is positioned closer to the emission side of the signal light source 10 than the second wavelength multiplexer 5. The second wavelength multiplexer 5 is positioned closer to the fiber amplifier 1 than the first wavelength multiplexer 3. The first wavelength multiplexer 3 is optically coupled to the first excitation light source 2 for multiplexing the signal light with the first excitation light emitted from the first excitation light source 2. The second wavelength multiplexer 5 is optically coupled to the second excitation light source 4 for multiplexing the signal light with the second excitation light emitted from the second excitation light source 4. Namely, the signal light is first multiplexed with the first excitation light by the first wavelength multiplexer 3 and then multiplexed with the second excitation light by the second wavelength multiplexer 5 prior to the transmission or propagation through the fiber amplifier 1.

The second amplifier unit 200 is positioned on the follower stage to the first amplifier unit 100. In the second amplifier unit 200, the first wavelength multiplexer 3' is positioned closer to the output side of the first amplifier unit 100 than the second wavelength multiplexer 5'. The second wavelength multiplexer 5' is positioned closer to the fiber amplifier 1' than the first wavelength multiplexer 3'. The first wavelength multiplexer 3' is optically coupled to the first excitation light source 2' for multiplexing the signal light with the first excitation light emitted from the first excitation light source 2'. The second wavelength multiplexer 5' is optically coupled to the second excitation light source 4' for multiplexing the signal light with the second excitation light emitted from the second excitation light source 4'. Namely, the signal light having been transmitted through the fiber amplifier 1 of the first amplifier unit 100 is further multiplexed with the first excitation light by the first wavelength multiplexer 3' and then multiplexed with the second excitation light by the second wavelength multiplexer 5' prior to the transmission or propagation through the fiber amplifier 1'.

It was confirmed that the obtained gain is 13 dB and a light-to-light conversion efficiency is approximately 10% under conditions that the output powers of the first excitation light sources 2 and 2' are 37 mW, and the output powers of the second excitation light sources 4 and 4' are 180 mW, and a wavelength of the signal light emitted from the signal light source 10 is 1660 nm, and an output power of the signal light is 0 dB.

With reference to FIG. 7, in the first amplifier unit 100, the first and second excitation light sources 2 and 4 of the laser amplifier are s o configured that the first and second excitation lights emitted from the first and second excitation light sources 2 and 4 are propagated through the fiber amplifier 1 in a forward direction, along which the signal light emitted from the signal light source 10 is propagated. In the second amplifier unit 200, the first and second excitation light sources 2' and 4' of the laser amplifier are so configured that the first and second excitation lights emitted from the first and second excitation light sources 2' and 4' are propagated through the fiber amplifier 1' in a forward direction, along which the signal light is propagated.

A typical example of modification to the configuration of the first and second excitation light sources 2 and 4 in the first amplifier unit 100 may be that at least any one of the first and second excitation light sources 2 and 4 is provided in the emission side of the fiber amplifier 1, so that at least one of the first type and second type excitation lights emitted from the at least one of the first and second excitation light sources 2 and 4 is propagated in an opposite direction to the propagation direction of the signal light.

A typical example of modification to the configuration of the first and second excitation light sources 2' and 4' in the second amplifier unit 200 may be that at least any one of the first and second excitation light sources 2' and 4' is provided in the emission side of the fiber amplifier 1', so that at least one of the first type and second type excitation lights emitted from the at least one of the first and second excitation light sources 2' and 4' is propagated in an opposite direction to the propagation direction of the signal light.

Another typical example of modification to the configuration of the first and second excitation light sources 2 and 4 in the first amplifier unit 100 may be that at least any one of the first and second excitation light sources 2 and 4 is provided in opposite sides of the fiber amplifier 1, so that at least one of the first type and second type excitation lights emitted from the at least one of the first and second excitation light sources 2 and 4 is bidirectionally propagated, for example, in the same direction as the signal light propagation and in the opposite direction to the signal light propagation.

Still another typical example of modification to the configuration of the first and second excitation light sources 2' and 4' in the second amplifier unit 200 may be that at least any one of the first and second excitation light sources 2' and 4' is provided in opposite sides of the fiber amplifier 1', so that at least one of the first type and second type excitation lights emitted from the at least one of the first and second excitation light sources 2' and 4' is bidirectionally propagated, for example, in the same direction as the signal light propagation and in the opposite direction to the signal light propagation.

In this embodiment, the first excitation light sources 2 and 2' respectively included in the first and second amplifier units 100 and 200 are adopted to emit the first type excitation lights with the same wavelength of 970 nm-wavelength-band from 960 nm to 985 nm. Notwithstanding, it is possible that the first excitation light sources 2 and 2' respectively included in the first and second amplifier units 100 and 200 are adopted to emit the first type excitation lights with the same wavelength ranged from 960 nm to 985 nm, or with different wavelengths from each other, provided that the different wavelengths are in the range of 960 nm to 985 nm.

In this embodiment, the second excitation light sources 4 and 4' respectively included in the first and second amplifier units 100 and 200 are adopted to emit the second type excitation lights with the same wavelength of 800 nm-wavelength-band from 780 nm to 810 nm. Notwithstanding, it is possible that the second excitation light sources 4 and 4' respectively included in the first and second amplifier units 100 and 200 are adopted to emit the second type excitation lights with the same wavelength ranged from 780 nm to 810 nm, or with different wavelengths from each other, provided that the different wavelengths are in the range of 780 nm to 810 nm.

Figure 8:
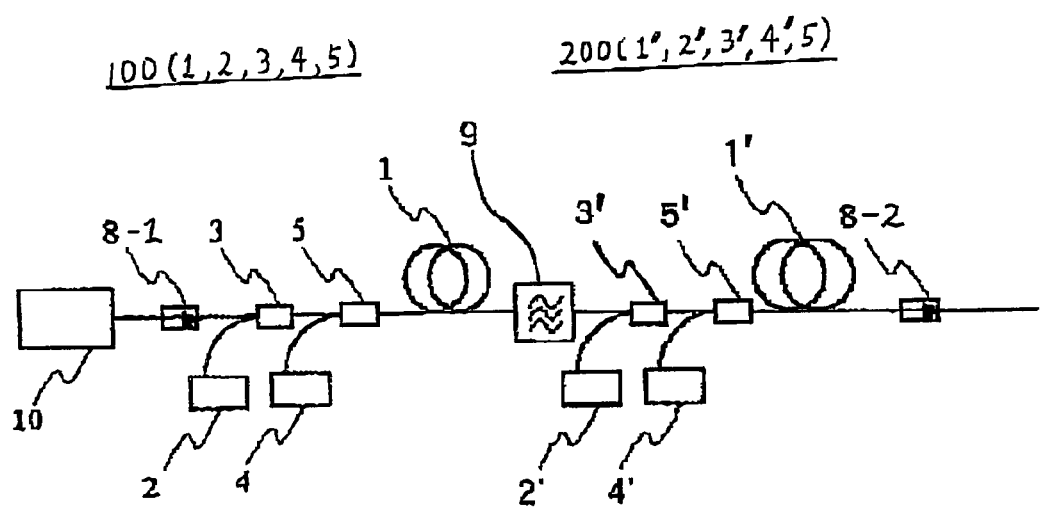
FIG. 8 is a schematic view illustrative of a configuration of a laser amplifier in a third embodiment in accordance with the present invention.

Third Embodiment:

A third embodiment according to the present invention will be described in detail with reference to the drawings. FIG. 8 is a schematic view illustrative of a configuration of a laser amplifier in a third embodiment in accordance with the present invention. The following descriptions will focus on differences of this embodiment from the above-described first embodiment in order to avoid substantially duplications of the descriptions thereof.

The laser amplifier may include a signal light source 10 for emitting a signal light, and a series connection of a first amplifier unit 100 (1, 2, 3, 4, and 5) and a second amplifier unit 200 (1', 2', 3', 4', and 5'), and further a cut-off device for cutting off any amplified spontaneous emission light with an unintended wavelength band is interposed between the amplifier units 100 and 200 coupled in series with each other. The cut-off device may be adopted to cut off at least one of lights ranged in wavelength from 500 nanometers to 560 nanometers and from 820 nanometers to 860 nanometers.

A pair of first and second optical isolators 8-1 and 8-2 is provided, wherein the first and second optical isolators 8-1 and 8-2 are positioned at both sides of the series connection of the first and second amplifier units 100 and 200. The first and second amplifier units 100 and 200 have the same structure and configuration.

The first amplifier unit 100 further includes a first excitation light source 2 for generating a first excitation light, a first wavelength multiplexer 3 for multiplexing the first excitation light to the signal light, a second excitation light source 4 for generating a second excitation light, a second wavelength multiplexer 5 for multiplexing the second excitation light to the signal light, and a fiber amplifier 1 comprising an amplifier medium for amplifying the signal light.

The second amplifier unit 200 further includes a first excitation light source 2' for generating the first excitation light, a first wavelength multiplexer 3' for multiplexing the first excitation light to the signal light, a second excitation light source 4' for generating the second excitation light, a second wavelength multiplexer 5' for multiplexing the second excitation light to the signal light, and a fiber amplifier 1' comprising the amplifier medium for amplifying the signal light.

In the above-described first embodiment, the laser amplifier has the single amplifier unit. In this third embodiment, the laser amplifier has the series connection of the two amplifier units which are directly coupled to each other for realizing a higher gain and a higher efficiency of the signal light amplification as compared to the laser amplifier of the first embodiment. The number of the amplifier units coupled in series should not be limited to two, even this embodiment presents two amplifier units as one typical example. It is, of course, possible that three or more amplifier units are optically coupled in series to form a multi-stage amplifier structure for obtaining a higher gain and a higher efficiency.

Under condition that an excitation light with a predetermined or fixed power can be obtained from the excitation light source, the gain of the amplifier varies depending upon variation of the length of the fiber amplifier. The gain takes a maximum value at an optimum length of the fiber amplifier, and both increase and decrease in the length of the fiber amplifier from the optimum length causes reductions of the gain. In general, the power of the excitation light from the sole excitation light source is finite, for which reason increasing the power of the excitation light by varying the length of the fiber amplifier is limitative. In accordance with this embodiment, the laser amplifier has the multi-stage optical coupling in series of plural amplifier units, each of which includes the fiber amplifier with an optimum length for taking a maximum gain with the limited power of the excitation light from the excitation light source, for realizing a multi-step amplification of the signal light at a high gain and a high efficiency with a reduced power loss of the excitation light.

Further, in accordance with this embodiment, as described above, the cut-off device for cutting off any amplified spontaneous emission light with an unintended wavelength band is interposed between adjacent two of the plural amplifier units coupled in series with each other. The cut-off device may be adopted to cut off at least one of lights ranged in wavelength from 500 nanometers to 560 nanometers and from 820 nanometers to 860 nanometers for suppressing an undesired amplified spontaneous emission light in those wavelength band. In accordance with a typical example, the cut-off device may be realized by a filter 9 with a transmittivity of at most 0.1% to a light with a wavelength ranged from 820 nanometers to 860 nanometers for suppressing an undesired amplified spontaneous emission light of a 850 nm-wavelength-band.

It is possible to increase the length of each of the fiber amplifiers 1 and 1' respectively included in the first and second amplifier units 100 and 200, based on the quantity of the excitation light from the excitation light source. The increase in the length of each of the fiber amplifiers 1 and 1' causes an undesired increase in power of the amplified spontaneous emission light. The amplified spontaneous emission light with the increased power suppresses a desired or intended stimulated emission by the signal light. This suppression makes it difficult to obtain a desired high gain of the optical amplifier. That suppression further causes an undesired conversion from the excitation light power to the amplified spontaneous emission light power, resulting in an undesired reduction in an efficiency of an energy conversion from the excitation light to the signal light.

In case of erbium ions, as shown in FIG. 1, the undesired or unintended spontaneous emission transition (c) from the laser upper level ($^4S_{3/2}$) to the excited state absorption lower level ($^4I_{13/2}$) conflicts with the desired or intended stimulated emission transitions (d and e) from the laser upper level ($^4S_{3/2}$, and $^2H_{11/2}$) to the laser lower level ($^4I_{9/2}$) for the amplification process. Namely, the undesired or unintended spontaneous emission transition (c) from the laser upper level ($^4S_{3/2}$) to the excited state absorption lower level ($^4I_{13/2}$) causes the undesired or unintended spontaneous emission light of the 850 nm-wavelength-band which suppresses a desired or intended amplification of the light with a wavelength of 1650 nm. This suppression causes undesired reductions of the gain and the energy conversion efficiency.

In order to avoid the above-described disadvantages, it is effective that the cut-off device, for example, the filter 9 for cutting off the undesired amplified spontaneous emission light is interposed between the fiber amplifiers 1 and 1' respectively included in the first and second amplifier units 100 and 200, so that the cut-off device or the filter 9 prevents any excess amplification of the amplified spontaneous emission light in the fiber amplifier 1' on the follower stage or in the second amplifier unit 200, whereby the desired or intended stimulated emission transitions (d and e) from the laser upper level ($^4S_{3/2}$, and $^2H_{11/2}$) to the laser lower level ($^4I_{9/2}$) is dominant over the undesired or unintended spontaneous emission transition (c) from the laser upper level ($^4S_{3/2}$) to the excited state absorption lower level ($^4I_{13/2}$), resulting in a highly efficient energy conversion from the laser upper level ($^4S_{3/2}$, and $^2H_{11/2}$) to the energy of the signal light. This permits realizing the desired high gain and high energy conversion efficiency.

The cut-off device may also be realized by an optical isolator which is the same as the optical isolators 8-1 and 8-2, instead of the filter 9. Namely, the optical isolator may be interposed between the fiber amplifiers 1 and 1' respectively included in the first and second amplifier units 100 and 200, so that the interposed optical isolator prevents propagation of the undesired amplified spontaneous emission light from the fiber amplifier 1' in the second amplifier unit 200 to the fiber amplifier 1 in the first amplifier unit 100, whereby the interposed optical isolator prevents any excess amplification of the amplified spontaneous emission light in the fiber amplifier 1 on the previous stage or in the first amplifier unit 100. This also contributes to realize the desired high gain and high energy conversion efficiency.

The fiber amplifier 1 included in the first amplifier unit 100 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1 should not be limited but a typical example thereof may be 3.2.

The fiber amplifier 1' included in the second amplifier unit 200 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1' should not be limited but a typical example thereof may be 5.2.

Each of the first excitation light sources 2 and 2' respectively included in the first and second amplifier units 100 and 200 may be realized by a semiconductor laser which emits a laser beam of a 970 nm-wavelength-band from 960 nm to 985 nm. Notwithstanding, the first excitation light sources 2 and 2' may, of course, be realized by any available first type excitation light sources which emit the first type excitation lights as described in the first embodiment.

Each of the second excitation light sources 4 and 4' respectively included in the first and second amplifier units 100 and 200 may be realized by a titanium sapphire laser which emits a laser beam of a 800 nm-wavelength-band from 780 nm to 810 nm. Notwithstanding, the second excitation light sources 4 and 4' may, of course, be realized by any available second type excitation light sources which emit the second type excitation lights as described in the first embodiment.

The signal light source 10 is capable of varying a wavelength of the emission signal light. An emission side of the signal light source 10 is optically coupled to the series connection of the first and second amplifier units 100 and 200. The emission signal light from the signal light source 10 is transmitted to the series connection of the first and second amplifier units 100 and 200. The first amplifier unit 100 is positioned closer to the emission side of the signal light source 10 than the second amplifier unit 200.

In the first amplifier unit 100, the first wavelength multiplexer 3 is positioned closer to the emission side of the signal light source 10 than the second wavelength multiplexer 5. The second wavelength multiplexer 5 is positioned closer to the fiber amplifier 1 than the first wavelength multiplexer 3. The first wavelength multiplexer 3 is optically coupled to the first excitation light source 2 for multiplexing the signal light with the first excitation light emitted from the first excitation light source 2. The second wavelength multiplexer 5 is optically coupled to the second excitation light source 4 for multiplexing the signal light with the second excitation light emitted from the second excitation light source 4. Namely, the signal light is first multiplexed with the first excitation light by the first wavelength multiplexer 3 and then multiplexed with the second excitation light by the second wavelength multiplexer 5 prior to the transmission or propagation through the fiber amplifier 1.

The signal light as amplified by the first amplifier unit 100 is further transmitted through the filter 9 to the second amplifier unit 200, wherein the undesired or unintended amplified spontaneous emission light is cut off by the filter 9.

In the second amplifier unit 200, the first wavelength multiplexer 3' is positioned closer to the output side of the first amplifier unit 100 than the second wavelength multiplexer 5'. The second wavelength multiplexer 5' is positioned closer to the fiber amplifier 1' than the first wavelength multiplexer 3'. The first wavelength multiplexer 3' is optically coupled to the first excitation light source 2' for multiplexing the signal light with the first excitation light emitted from the first excitation light source 2'. The second wavelength multiplexer 5' is optically coupled to the second excitation light source 4' for multiplexing the signal light with the second excitation light emitted from the second excitation light source 4'. Namely, the signal light having been transmitted through the filter 9 is further multiplexed with the first excitation light by the first wavelength multiplexer 3' and then multiplexed with the second excitation light by the second wavelength multiplexer 5' prior to the transmission or propagation through the fiber amplifier 1'.

It was confirmed that the obtained gain is 16 dB and a light-to-light conversion efficiency is approximately 17% under conditions that the output powers of the first excitation light sources 2 and 2' are 37 mW, and the output powers of the second excitation light sources 4 and 4' are 180 mW, and a wavelength of the signal light emitted from the signal light source 10 is 1660 nm, and an output power of the signal light is 0 dB. This demonstrates that the cut-off device interposed between the first and second amplifier units 100 and 200 for cutting off the undesired amplified spontaneous emission light improves the gain and the light-to-light conversion efficiency, because the filter 9 cuts off the undesired amplified spontaneous emission light with the 850 nm-wavelength-band, whereby the desired or intended stimulated emission transitions (d and e) from the laser upper level ($^4S_{3/2}$, and $^2H_{11/2}$) to the laser lower level ($^4I_{9/2}$) becomes dominant over the undesired or unintended spontaneous emission transition (c) from the laser upper level ($^4S_{3/2}$) to the excited state absorption lower level ($^4I_{13/2}$), resulting in a highly efficient energy conversion from the laser upper level ($^4S_{3/2}$, and $^2H_{11/2}$) to the energy of the signal light. This permits realizing the desired high gain and high energy conversion efficiency.

An undesired or unintended transition from the laser upper level ($^4S_{3/2}$) to the ground level ($^4I_{15/2}$) causes a spontaneous emission light with a 550 nm-wavelength-band. It is also preferable that the cut-off device such as the filter 9 is adopted to cut off a light with a wavelength ranged from 500 nm to 560 nm. It is more preferable that the cut-off device such as the filter 9 is adopted to cut off both the light with the wavelength ranged from 500 nm to 560 nm and the light with the wavelength ranged from 820 nm to 860 nm.

The above cut-off device may also be realized by an optical isolator which uses a magnetooptic crystal, for example, an yttrium iron garnet crystal (YIG-crystal) for allowing transmission of a light with a 1650 nm-wavelength-band, but cutting off both lights with wavelength bands from 500 nm to 560 nm and from 820 nm to 860 nm.

With reference to FIG. 8, in the first amplifier unit 100, the first and second excitation light sources 2 and 4 of the laser amplifier are so configured that the first and second excitation lights emitted from the first and second excitation light sources 2 and 4 are propagated through the fiber amplifier 1 in a forward direction, along which the signal light emitted from the signal light source 10 is propagated. In the second amplifier unit 200, the first and second excitation light sources 2' and 4' of the laser amplifier are so configured that the first and second excitation lights emitted from the first and second excitation light sources 2' and 4' are propagated through the fiber amplifier 1' in a forward direction, along which the signal light is propagated.

A typical example of modification to the configuration of the first and second excitation light sources 2 and 4 in the first amplifier unit 100 may be that at least any one of the first and second excitation light sources 2 and 4 is provided in the emission side of the fiber amplifier 1, so that at least one of the first type and second type excitation lights emitted from the at least one of the first and second excitation light sources 2 and 4 is propagated in an opposite direction to the propagation direction of the signal light.

A typical example of modification to the configuration of the first and second excitation light sources 2' and 4' in the second amplifier unit 200 may be that at least any one of the first and second excitation light sources 2' and 4' is provided in the emission side of the fiber amplifier 1', so that at least one of the first type and second type excitation lights emitted from the at least one of the first and second excitation light sources 2' and 4' is propagated in an opposite direction to the propagation direction of the signal light.

Another typical example of modification to the configuration of the first and second excitation light sources 2 and 4 in the first amplifier unit 100 may be that at least any one of the first and second excitation light sources 2 and 4 is provided in opposite sides of the fiber amplifier 1, so that at least one of the first type and second type excitation lights emitted from the at least one of the first and second excitation light sources 2 and 4 is bidirectionally propagated, for example, in the same direction as the signal light propagation and in the opposite direction to the signal light propagation.

Still another typical example of modification to the configuration of the first and second excitation light sources 2' and 4' in the second amplifier unit 200 may be that at least any one of the first and second excitation light sources 2' and 4' is provided in opposite sides of the fiber amplifier 1', so that at least one of the first type and second type excitation lights emitted from the at least one of the first and second excitation light sources 2' and 4' is bidirectionally propagated, for example, in the same direction as the signal light propagation and in the opposite direction to the signal light propagation.

Figure 9:
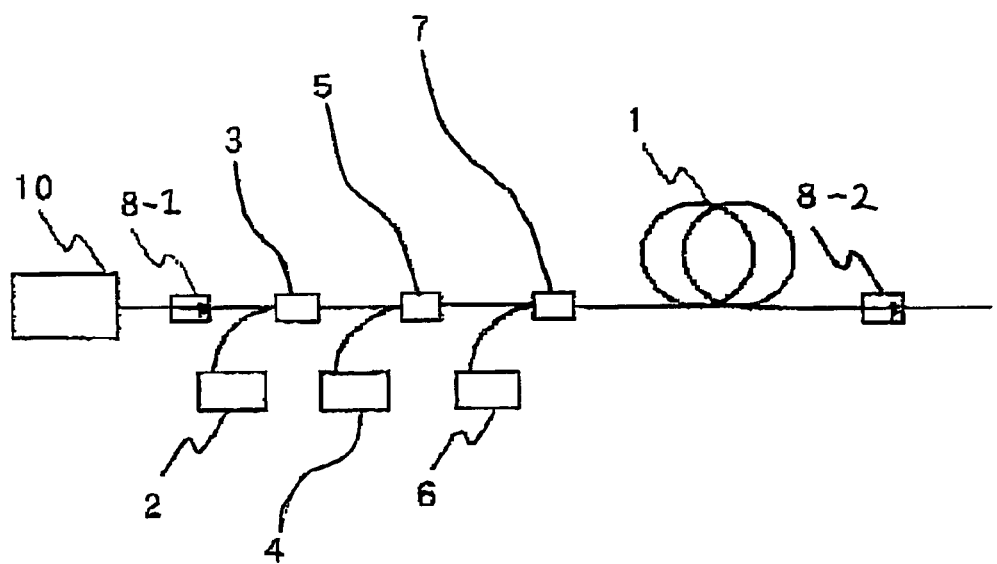
FIG. 9 is a schematic view illustrative of a configuration of a laser amplifier in a fourth embodiment in accordance with the present invention.

Fourth Embodiment:

A fourth embodiment according to the present invention will be described in detail with reference to the drawings. FIG. 9 is a schematic view illustrative of a configuration of a laser amplifier in a fourth embodiment in accordance with the present invention. The following descriptions will focus on differences of this embodiment from the above-described first embodiment in order to avoid substantially duplications of the descriptions thereof.

As shown in FIG. 9, the laser amplifier may include a signal light source 10 for emitting a signal light, a first excitation light source 2 for generating a first excitation light, a first wavelength multiplexer 3 for multiplexing the first excitation light to the signal light, a second excitation light source 4 for generating a second excitation light, a second wavelength multiplexer 5 for multiplexing the second excitation light to the signal light, a gain enhancement light source 6 for generating a gain enhancement light, a third wavelength multiplexer 5 for multiplexing the gain enhancement light to the signal light, and a fiber amplifier 1 comprising an amplifier medium for amplifying the signal light.

The signal light source 10 is capable of varying a wavelength of the emission signal light. An emission side of the signal light source 10 is optically coupled through a series connection of the first, second and third wavelength multiplexers 3, 5 and 7 to the fiber amplifier 1. The emission signal light from the signal light source 10 is transmitted to the fiber amplifier 1. The first wavelength multiplexer 3 is positioned closer to the emission side of the signal light source 10 than the second wavelength multiplexer 5. The third wavelength multiplexer 7 is positioned closer to the fiber amplifier 1 than the second wavelength multiplexer 5. The second wavelength multiplexer 5 is positioned between the first and third multiplexers 3 and 7.

The first wavelength multiplexer 3 is optically coupled to the first excitation light source 2 for multiplexing the signal light with the first excitation light emitted from the first excitation light source 2. The second wavelength multiplexer 5 is optically coupled to the second excitation light source 4 for multiplexing the signal light with the second excitation light emitted from the second excitation light source 4. The third wavelength multiplexer 7 is optically coupled to the gain enhancement light source 6 for multiplexing the signal light with the gain enhancement light emitted from the gain enhancement light source 6. Namely, the signal light is first multiplexed with the first excitation light by the first wavelength multiplexer 3 and then multiplexed with the second excitation light by the second wavelength multiplexer 5 and further multiplexed with the gain enhancement light by the third wavelength multiplexer 7 prior to the transmission or propagation through the fiber amplifier 1.

A first optical isolator 8-1 is optionally and preferably interposed between the signal light source 10 and the first wavelength multiplexer 3. Also, a second optical isolator 8-2 is optionally and preferably provided in an emission side or an output side of the fiber amplifier 1. The first and second optical isolators 8-1 and 8-2 suppress any unintended or undesired laser emission due to an unintended or undesired reflected light.

The fiber amplifier 1 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1 should not be limited but a typical example thereof may be 5.2.

The first excitation light source 2 may be realized by a semiconductor laser which emits a laser beam of a 970 nm-wavelength-band from 960 nm to 985 nm. Notwithstanding, the first excitation light source 2 may, of course, be realized by any available first type excitation light sources which emit the first type excitation lights as described in the first embodiment.

The second excitation light source 4 may be realized by a titanium sapphire laser which emits a laser beam of a 800 nm-wavelength-band from 780 nm to 790 nm. Notwithstanding, the second excitation light source 4 may, of course, be realized by any available second type excitation light sources which emit the second type excitation lights as described in the first embodiment.

The gain enhancement light source 6 may be realized by a semiconductor laser which emits a laser beam of a peaked wavelength of 841 nm.

Figure 10:
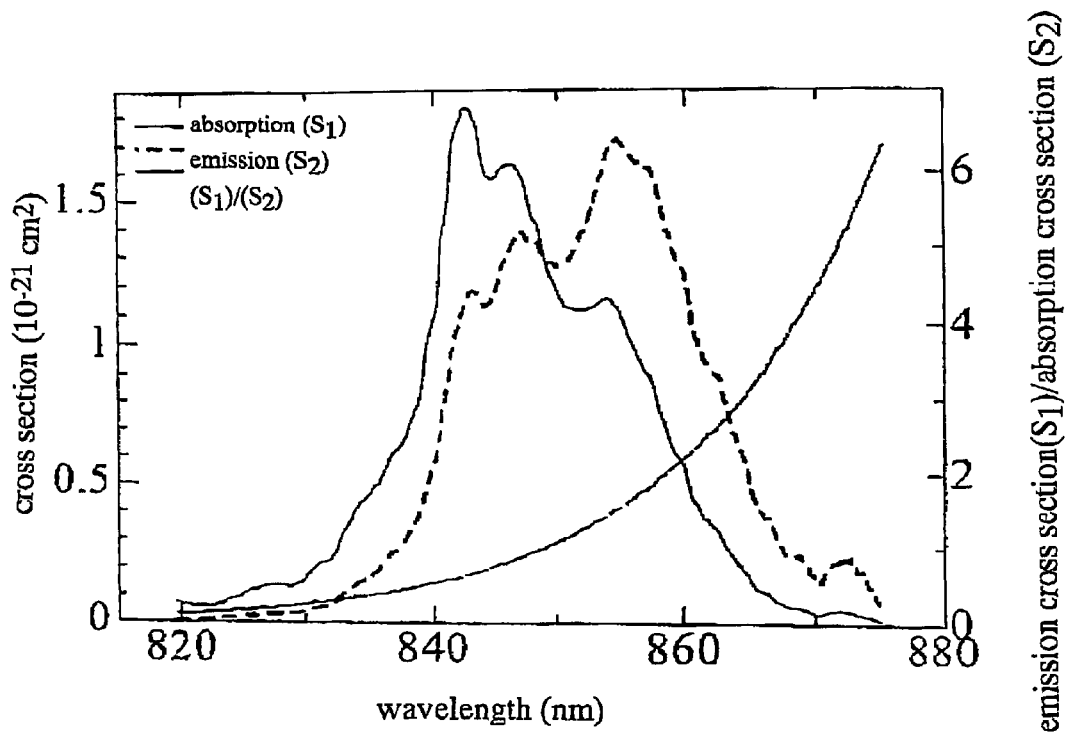
FIG. 10 is a diagram illustrative of variations in both cross sections of emission and absorption transitions between the laser upper level ($^4S_{3/2}$) and the excited state absorption lower level ($^4I_{13/2}$) of erbium ion and a variation in a ratio of emission transition cross section to absorption transition cross section.

FIG. 10 is a diagram illustrative of variations in both cross sections of emission and absorption transitions between the laser upper level ($^4S_{3/2}$) and the excited state absorption lower level ($^4I_{13/2}$) of erbium ion and a variation in a ratio of emission transition cross section to absorption transition cross section. The emission transition is the transition from the laser upper level ($^4S_{3/2}$) and the excited state absorption lower level ($^4I_{13/2}$). The absorption transition is the transition from the excited state absorption lower level ($^4I_{13/2}$) to the laser upper level ($^4S_{3/2}$). A real line represents the variation of the absorption transition cross section. A broken line represents the variation of the emission transition cross section. In the wavelength range lower than 850, the absorption transition cross section is greater than the emission transition cross section. In the wavelength range higher than 850, the emission transition cross section is greater than the absorption transition cross section. A ratio of the emission transition cross section to the absorption transition cross section is represented by another real line, which simply increases as the wavelength increases. At the wavelength of 841 nm, a ratio ($S_1/S_2$) of the emission transition cross section ($S_1$) to the absorption transition cross section ($S_2$) is approximately 0.55.

Figure 11:
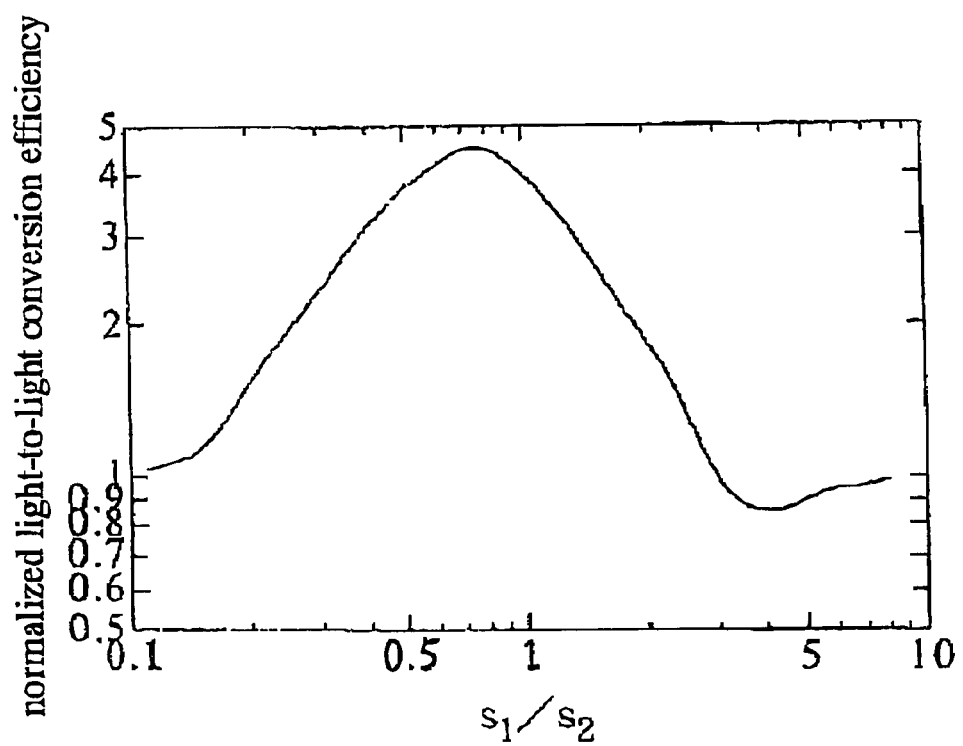
FIG. 11 is a diagram illustrative of a variation of a normalized light-to-light conversion efficiency over a ratio ($S_1/S_2$) of the emission transition cross section ($S_1$) to the absorption transition cross section ($S_2$), under a condition of no use of the gain enhancement light.

FIG. 11 is a diagram illustrative of a variation of a normalized light-to-light conversion efficiency over a ratio ($S_1/S_2$) of the emission transition cross section ($S_1$) to the absorption transition cross section ($S_2$), wherein the normalization was made with the light-to-light conversion efficiency under a condition of no use of the gain enhancement light. The normalized light-to-light conversion efficiency takes a maximum value at the ratio ($S_1/S_2$) of approximately 0.72. Namely, at the ratio ($S_1/S_2$) of approximately 0.72, the use of the gain enhancement light increases the light-to-light efficiency by at least 4 times. If the ratio ($S_1/S_2$) takes approximately 0.72, then the light wavelength is 845 nm. In the range of the ratio ($S_1/S_2$) from 0.2 to 2.2, the normalized light-to-light conversion efficiency is over 1.5. Namely, in the range of the ratio ($S_1/S_2$) from 0.2 to 2.2, the use of the gain enhancement light increases the light-to-light efficiency by at least 1.5 times. The preferable range of the ratio ($S_1/S_2$) is 0.2 to 2.2.

It was confirmed that the obtained gain is 23 dB and a light-to-light conversion efficiency is approximately 28% under conditions that the output power of the first excitation light source 2 is 37 mW, and the output power of the second excitation light source 4 is 180 mW, and the output power of the gain enhancement light source 6 is 1 mW, and a wavelength of the signal light emitted from the signal light source 10 is 1660 nm, and an output power of the signal light is −5 dB.

With reference again to FIG. 9, the first and second excitation light sources 2 and 4 of the laser amplifier are so configured that the first and second excitation lights emitted from the first and second excitation light sources 2 and 4 are propagated through the fiber amplifier 1 in a forward direction, along which the signal light emitted from the signal light source 10 is propagated.

A typical example of modification to the configuration of the first and second excitation light sources 2 and 4 in the laser amplifier may be that at least any one of the first and second excitation light sources 2 and 4 is provided in the emission side of the fiber amplifier 1, so that at least one of the first type and second type excitation lights emitted from the at least one of the first and second excitation light sources 2 and 4 is propagated in an opposite direction to the propagation direction of the signal light.

Another typical example of modification to the configuration of the first and second excitation light sources 2 and 4 in the laser amplifier may be that at least any one of the first and second excitation light sources 2 and 4 is provided in opposite sides of the fiber amplifier 1, so that at least one of the first type and second type excitation lights emitted from the at least one of the first and second excitation light sources 2 and 4 is bidirectionally propagated, for example, in the same direction as the signal light propagation and in the opposite direction to the signal light propagation.

Figure 12:
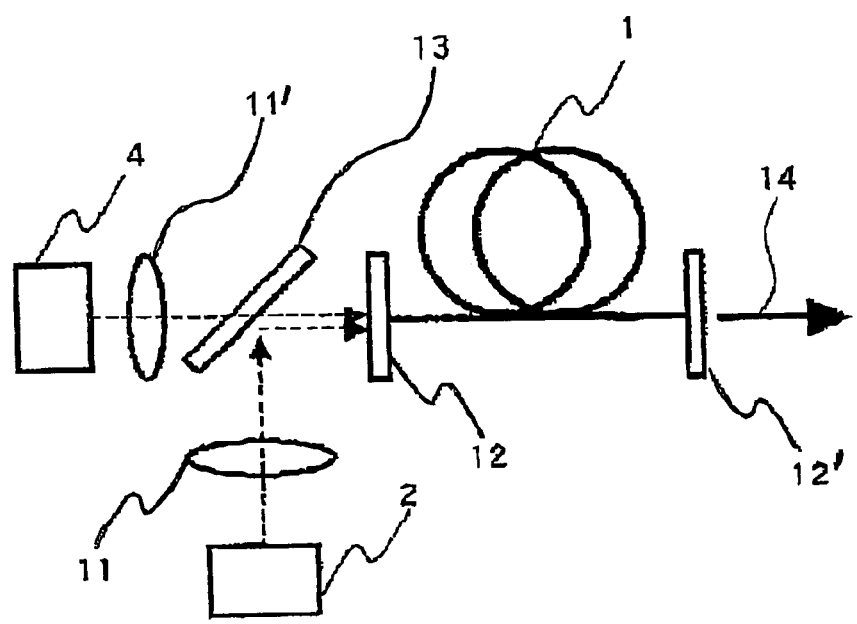
FIG. 12 is a schematic view illustrative of a configuration of a laser amplifier in a fifth embodiment in accordance with the present invention.

Fifth Embodiment:

A fifth embodiment according to the present invention will be described in detail with reference to the drawings. FIG. 12 is a schematic view illustrative of a configuration of a laser amplifier in a fifth embodiment in accordance with the present invention. The following descriptions will focus on differences of this embodiment from the above-described first embodiment in order to avoid substantially duplications of the descriptions thereof.

As shown in FIG. 12, the laser amplifier may include a first excitation light source 2 for generating a first excitation light, a second excitation light source 4 for generating a second excitation light, a fiber amplifier 1 comprising an amplifier medium for amplifying an excitation light, a first optical system 50 for guiding the first and second excitation lights to the fiber amplifier 1, and a second optical system 60 for mirroring the excitation light at both sides of the fiber amplifier 1. The first optical system 50 further includes a dichroic mirror 13, a first optical lens 11 and a second optical lens 11'. The second optical system 60 further includes a pair of a rear side mirror 12 and an output side mirror 12'. The rear side mirror 12 is positioned at the incident side of the fiber amplifier 1. The output side mirror 12' is positioned at the output side of the fiber amplifier 1.

The fiber amplifier 1 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1 should not be limited but a typical example thereof may be 5.2.

The first excitation light source 2 may be realized by a semiconductor laser which emits a laser beam of a 970 nm-wavelength-band from 960 nm to 985 nm. Notwithstanding, the first excitation light source 2 may, of course, be realized by any available first type excitation light sources which emit the first type excitation lights as described in the first embodiment.

The second excitation light source 4 may be realized by a titanium sapphire laser which emits a laser beam of a 800 nm-wavelength-band from 780 nm to 790 nm. Notwithstanding, the second excitation light source 4 may, of course, be realized by any available second type excitation light sources which emit the second type excitation lights as described in the first embodiment.

The first excitation light emitted from the first excitation light source 2 is transmitted through the first optical lens 11 and then reflected by the dichroic mirror 13, and the reflected first excitation light is then transmitted through the rear side mirror 12 and incident into the fiber amplifier 1. The second excitation light emitted from the second excitation light source 4 is transmitted through the second optical lens 11', the dichroic mirror 13, and the rear side mirror 12 to the fiber amplifier 1. The first and second optical lenses 11 and 11' are provided in order to cause the first and second excitation lights to focus onto the incident side of the fiber amplifier 1.

The rear side mirror 12 is adopted to allow transmissions of the first and second excitation lights emitted from the first and second excitation light sources 2 and 4 and to perform a total reflection to a light of a 1650 nm-wavelength-band. The output side mirror 12' performs a partial reflection to the light of the 1650 nm-wavelength-band. Namely, the pair of the rear side mirror 12 and the output side mirror 12' performs mirroring the light of the 1650 nm-wavelength-band.

The incidence of the first and second excitation lights into the fiber amplifier 1 causes an emission of a laser beam with a 1650 nm-wavelength-band from the emission side of the fiber amplifier 1.

Figure 13:
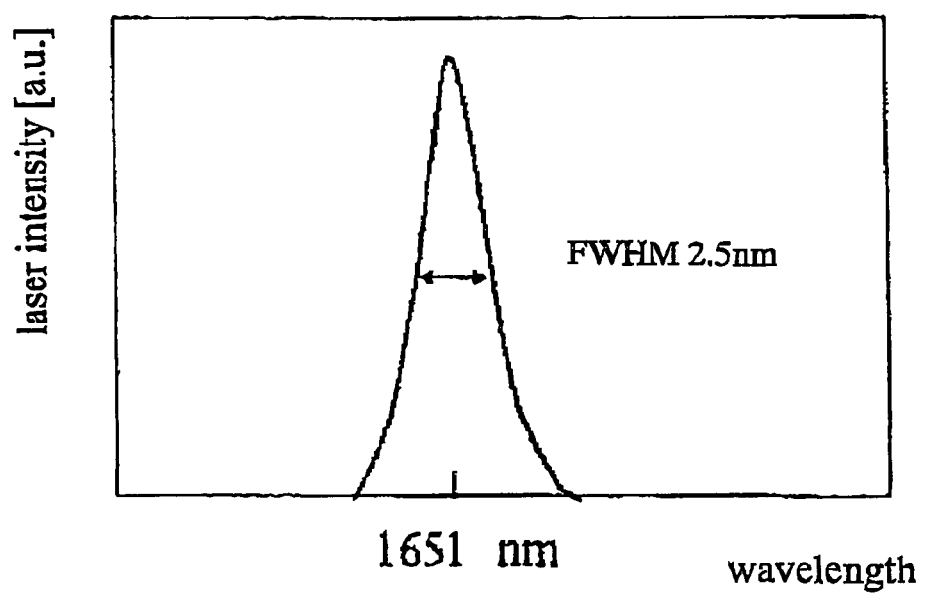
FIG. 13 is a diagram illustrative of a spectrum of a laser beam intensity over wavelength for a laser emission from a fiber amplifier shown in FIG. 12.

FIG. 13 is a diagram illustrative of a spectrum of a laser beam intensity over wavelength for a laser emission from a fiber amplifier shown in FIG. 12. It was confirmed that at a wavelength of 1651 nm, a full width at half maximum is 2.5 nm.

Figure 14:
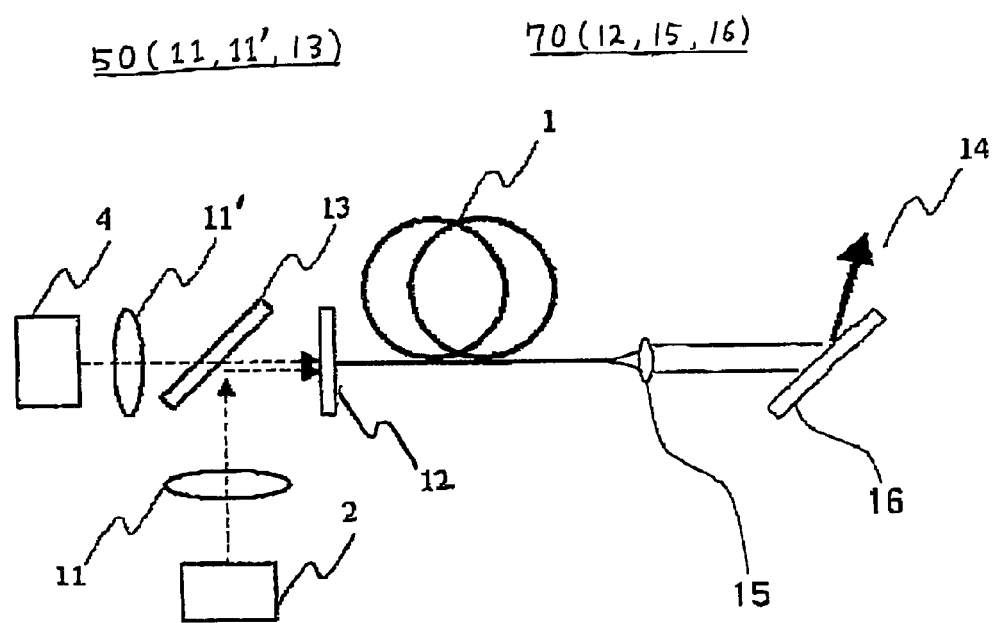
FIG. 14 is a schematic view illustrative of a configuration of a laser amplifier in a sixth embodiment in accordance with the present invention.

Sixth Embodiment:

A sixth embodiment according to the present invention will be described in detail with reference to the drawings. FIG. 14 is a schematic view illustrative of a configuration of a laser amplifier in a sixth embodiment in accordance with the present invention. The following descriptions will focus on differences of this embodiment from the last-described fifth embodiment in order to avoid substantially duplications of the descriptions thereof. A structural difference of this embodiment from the fifth embodiment is that a collimate lens 15 and a diffraction grating 16 are provided instead of the output side mirror.

The fiber amplifier 1 may be realized by a fiber waveguide which comprises a fluorozirconate glass doped with erbium ions ($Er^{3+}$). A concentration of erbium ions should not be limited but a typical example thereof may be 2000 ppm. A core diameter of the fiber amplifier 1 should not be limited but a typical example thereof may be 4.4 micrometers. A length of the fiber amplifier 1 should not be limited but a typical example thereof may be 5.2.

The first excitation light source 2 may be realized by a semiconductor laser which emits a laser beam of a 970 nm-wavelength-band from 960 nm to 985 nm. Notwithstanding, the first excitation light source 2 may, of course, be realized by any available first type excitation light sources which emit the first type excitation lights as described in the first embodiment.

The second excitation light source 4 may be realized by a titanium sapphire laser which emits a laser beam of a 800 nm-wavelength-band from 780 nm to 790 nm. Notwithstanding, the second excitation light source 4 may, of course, be realized by any available second type excitation light sources which emit the second type excitation lights as described in the first embodiment.

The first excitation light emitted from the first excitation light source 2 is transmitted through the first optical lens 11 and then reflected by the dichroic mirror 13, and the reflected first excitation light is then transmitted through the rear side mirror 12 and incident into the fiber amplifier 1. The second excitation light emitted from the second excitation light source 4 is transmitted through the second optical lens 11', the dichroic mirror 13, and the rear side mirror 12 to the fiber amplifier 1. The first and second optical lenses 11 and 11' are provided in order to cause the first and second excitation lights to focus onto the incident side of the fiber amplifier 1.

The rear side mirror 12 is adopted to allow transmissions of the first and second excitation lights emitted from the first and second excitation light sources 2 and 4 and to perform a total reflection to a light of a 1650 nm-wavelength-band.

The incidence of the first and second excitation lights into the fiber amplifier 1 causes an emission of a laser beam with a 1650 nm-wavelength-band from the emission side of the fiber amplifier 1.

The laser beam emitted from the fiber amplifier 1 is collimated by the collimate lens 15. The collimated laser beam is then diffracted by the diffraction grating 16, wherein a light of a specific wavelength is selectively reflected. The specific wavelength depends upon an angle of the diffraction grating 16 to a transmission direction of the laser beam. Selection of the specific wavelength, at which the light is selectively reflected by the diffraction grating 16, is made by adjusting the angle of the diffraction grating 16 to the transmission direction of the laser beam.

Figure 15:
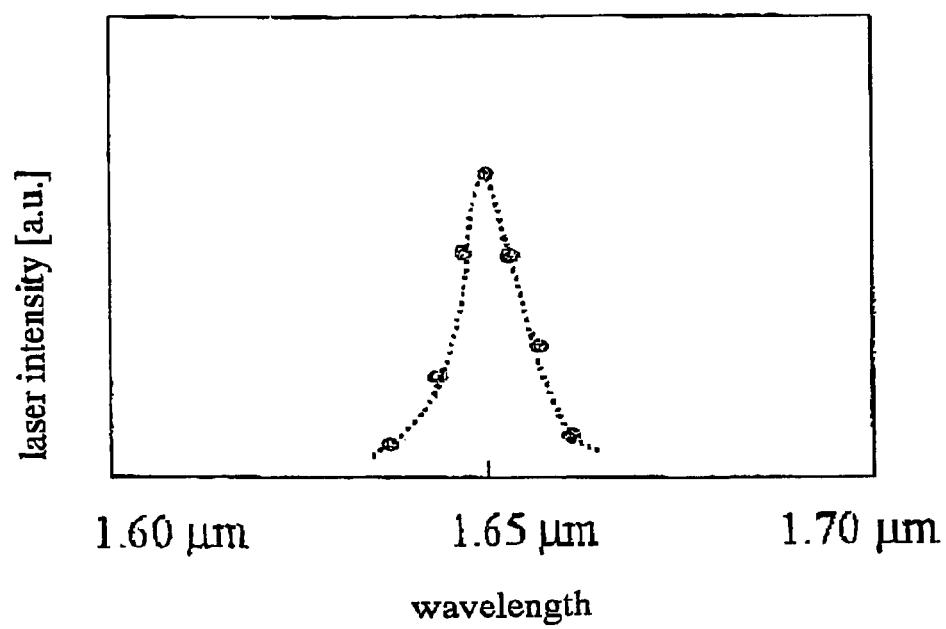
FIG. 15 is a diagram illustrative of a spectrum of a laser beam intensity over wavelength for a laser emission from a fiber amplifier shown in FIG. 14.
Figure 16:
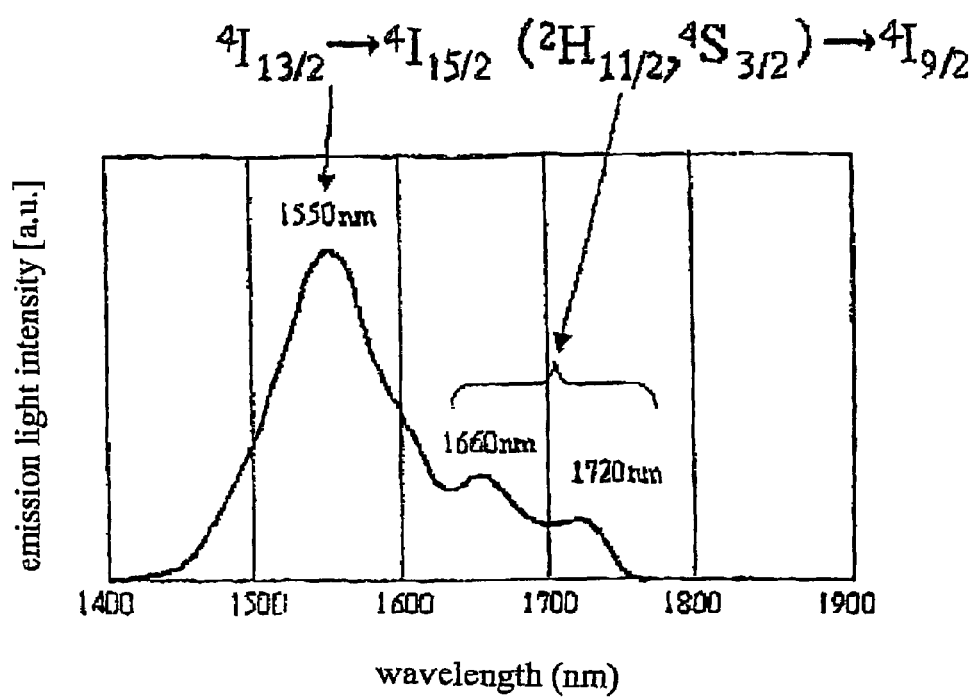
FIG. 16 is a diagram illustrative of an emission spectrum due to an emission transition from the laser upper level ($^2H_{11/2}$) to the laser lower level ($^4I_{9/2}$) or another emission transition from the laser upper level ($^4S_{3/2}$) to the laser lower level ($^4I_{9/2}$) is broaden in the wavelength band from 1620 nm to 1720 nm.

FIG. 15 is a diagram illustrative of a spectrum of a laser beam intensity over wavelength for a laser emission from a fiber amplifier shown in FIG. 14, wherein a variable wavelength width at a vicinity of a 1.65 μm-wavelength is shown. It was confirmed that the laser amplifier shown in FIG. 14 is capable of varying the emission laser beam at a variable wavelength width of approximately 5 nm. This variable wavelength width largely depends upon accuracy of alignments of constitutional elements of the laser amplifier and also upon a diffraction performance of the diffraction grating 16.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An optical amplifier including:
    an amplifier medium allowing a propagation of a signal light which is subject to an amplification, said amplifier medium being doped with at least one kind of rare-earth ions, and each of said at least one kind of rare-earth ions having an energy level system which includes:
        a ground level;
        a first pair of a laser upper level and a laser lower level which is higher than said ground level and lower than said laser upper level; and
        a second pair of an excited state absorption upper level, and an excited state absorption lower level which is lower than said excited state absorption upper level, wherein said second pair allows absorbing an emission light generated by a transition from said laser upper level to said laser lower level, and wherein said excited state absorption lower level is higher than said ground level and lower than said laser upper level, and wherein said excited state absorption lower level is different from said laser lower level;
    a first excitation generator for causing a first type excitation of said at least one kind of rare-earth ions to cause a population inversion between said laser upper level and said laser lower level; and
    a second excitation generator for causing a second type excitation of said at least one kind of rare-earth ions from said excited state absorption lower level to a high excited level which is equal to or higher than said laser upper level.

2. The optical amplifier as claimed in claim 1, wherein said first type excitation is a transition of said at least one kind of rare-earth ions from said ground level to said high excited level.

3. The optical amplifier as claimed in claim 1, wherein said first excitation generator generates at least one of first type excitation lights which cause said first type excitation, and said second excitation generator generates at least one of second type excitation lights which cause said first second type excitation, and said second type excitation lights are different in wavelength from said first type excitation lights.

4. The optical amplifier as claimed in claim 1,
    wherein said laser upper level includes at least one of plural different energy levels thermally coupled with each other,
    wherein said laser lower level includes at least one of plural different energy levels thermally coupled with each other,
    wherein said excited state absorption upper level includes at least one of plural different energy levels thermally coupled with each other, and
    wherein said excited state absorption lower level includes at least one of plural different energy levels thermally coupled with each other.

5. The optical amplifier as claimed in claim 1, wherein said amplifier medium is in a form of an optical fiber waveguide, and said optical amplifier is in a form of an optical fiber laser.

6. The optical amplifier as claimed in claim 1, wherein said amplifier medium comprises a fluorozirconate glass doped with erbium ions.

7. The optical amplifier as claimed in claim 1, wherein a base material of said amplifier medium comprises a fluorozirconate glass.

8. The optical amplifier as claimed in claim 1, wherein said at least one kind of rare-earth ions comprises erbium ions.

9. The optical amplifier as claimed in claim 8, wherein said laser upper level includes at least one of $^4S_{3/2}$, and $^2H_{11/2}$, and said laser lower level includes $^4I_{9/2}$, said excited state absorption lower level includes $^4I_{3/2}$, and said excited state absorption upper level includes $^4I_{9/2}$.

10. The optical amplifier as claimed in claim 8,
    wherein said first excitation generator generates at least one of first type excitation lights, which are ranged in wavelength from 960 nanometers to 985 nanometers, and which cause said first type excitation, and
    wherein said second excitation generator generates at least one of second type excitation lights, are ranged in wavelength from 780 nanometers to 790 nanometers, and which cause said first second type excitation.

11. The optical amplifier as claimed in claim 8,
    wherein said first excitation generator generates at least one of first type excitation lights, which are ranged in wavelength from 795 nanometers to 805 nanometers, and which cause said first type excitation, and
    wherein said second excitation generator generates at least one of second type excitation lights, are ranged in wavelength from 780 nanometers to 790 nanometers, and which cause said first second type excitation.

12. The optical amplifier as claimed in claim 8, wherein said optical amplifier includes plural optical amplifier units coupled in series with each other, and wherein each of said plural optical amplifier units further includes said amplifier medium, said first excitation generator and said second excitation generator.

13. The optical amplifier as claimed in claim 12, wherein a cut-off device for cutting off any amplified spontaneous emission light is interposed between adjacent two of said plural optical amplifier units coupled in series with each other.

14. The optical amplifier as claimed in claim 13, wherein said cut-off device cuts off at least one of lights ranged in wavelength from 500 nanometers to 560 nanometers and from 820 nanometers to 860 nanometers.

15. The optical amplifier as claimed in claim 9, further including:
a gain enhancement generator for supplying said amplifier medium with a gain enhancement light with a wavelength which causes that a ratio $S_1/S_2$ of a first cross section $S_1$ of a transition from $^4S_{3/2}$-level to $^4I_{13/2}$-level to a second cross section $S_2$ of a transition from $^4I_{13/2}$-level to $^4S_{3/2}$-level is ranged from 0.2 to 2.2.

16. The optical amplifier as claimed in claim 8, wherein $(D \times L)/(S \times P)$ is ranged from 1 to 10, where D is a concentration (ppm) of said erbium ions, L is an interaction length (m) between said amplifier medium and excitation light, S is an interaction cross section ($\mu m^2$) between said amplifier medium and excitation lights, and P is a total power (mW) of said first type excitation light and said second type excitation light which are incident into said amplifier medium.

17. An optical amplifier including:
an optical fiber waveguide comprising an amplifier medium which further comprises a fluorozirconate glass doped with erbium ions having an energy level system which includes:
a ground level;
a first pair of a laser upper level and a laser lower level which is higher than said ground level and lower than said laser upper level; and
a second pair of an excited state absorption upper level, and an excited state absorption lower level which is lower than said excited state absorption upper level, wherein said second pair allows absorbing an emission light generated by a transition from said laser upper level to said laser lower level, and wherein said excited state absorption lower level is higher than said ground level and lower than said laser upper level, and wherein said excited state absorption lower level is different from said laser lower level;
a first excitation generator which generates at least one of first type excitation lights which cause a first type excitation of said erbium ions to cause a population inversion between said laser upper level and said laser lower level; and
a second excitation generator generates at least one of second type excitation lights which cause a second type excitation of said erbium ions from said excited state absorption lower level to a high excited level which is equal to or higher than said laser upper level, wherein said second type excitation lights are different in wavelength from said first type excitation lights.

18. The optical amplifier as claimed in claim 17, wherein said laser upper level includes at least one of $^4S_{3/2}$, and $^2H_{11/2}$, and said laser lower level includes $^4I_{9/2}$, said excited state absorption lower level includes $^4I_{3/2}$, and said excited state absorption upper level includes $^4I_{9/2}$.

19. The optical amplifier as claimed in claim 17, wherein said first excitation generator generates at least one of first type excitation lights, which are ranged in wavelength from 960 nanometers to 985 nanometers, and which cause said first type excitation, and
wherein said second excitation generator generates at least one of second type excitation lights, are ranged in wavelength from 780 nanometers to 790 nanometers, and which cause said first second type excitation.

20. The optical amplifier as claimed in claim 17, wherein said first excitation generator generates at least one of first type excitation lights, which are ranged in wavelength from 795 nanometers to 805 nanometers, and which cause said first type excitation, and
wherein said second excitation generator generates at least one of second type excitation lights, are ranged in wavelength from 780 nanometers to 790 nanometers, and which cause said first second type excitation.

21. The optical amplifier as claimed in claim 17, wherein said optical amplifier includes plural optical amplifier units coupled in series with each other, and wherein each of said plural optical amplifier units further includes said amplifier medium, said first excitation generator and said second excitation generator.

22. The optical amplifier as claimed in claim 21, wherein a cut-off device for cutting off any amplified spontaneous emission light is interposed between adjacent two of said plural optical amplifier units coupled in series with each other.

23. The optical amplifier as claimed in claim 22, wherein said cut-off device cuts off at least one of lights ranged in wavelength from 500 nanometers to 560 nanometers and from 820 nanometers to 860 nanometers.

24. The optical amplifier as claimed in claim 17, further including:
a gain enhancement generator for supplying said amplifier medium with a gain enhancement light with a wavelength which causes that a ratio $S_1/S_2$ of a first cross section $S_1$ of a transition from $^4S_{3/2}$-level to $^4I_{13/2}$-level to a second cross section $S_2$ of a transition from $^4I_{13/2}$-level to $^4S_{3/2}$-level is ranged from 0.2 to 2.2.

25. The optical amplifier as claimed in claim 17, wherein $(D \times L)/(S \times P)$ is ranged from 1 to 10, where D is a concentration (ppm) of said erbium ions, L is an interaction length (m) between said amplifier medium and excitation light, S is an interaction cross section ($\mu m^2$) between said amplifier medium and excitation light, and P is a total power (mW) of said first type excitation light and said second type excitation light which are incident into said amplifier medium.

26. A method of operating an optical amplifier which includes:
an amplifier medium allowing a propagation of a signal light which is subject to an amplification, said amplifier medium being doped with at least one kind of rare-earth ions, and each of said at least one kind of rare-earth ions having an energy level system which includes:
a ground level;
a first pair of a laser upper level and a laser lower level which is higher than said ground level and lower than said laser upper level; and
a second pair of an excited state absorption upper level, and an excited state absorption lower level which is lower than said excited state absorption upper level, wherein said second pair allows absorbing an emission light generated by a transition from said laser upper level to said laser lower level, and wherein said excited state absorption lower level is higher than said ground level and lower than said laser upper level, and wherein said excited state absorption lower level is different from said laser lower level,
wherein said method includes:
causing a first type excitation of said at least one kind of rare-earth ions to cause a population inversion between said laser upper level and said laser lower level; and causing a second type excitation of said at least one kind of rare-earth ions from said excited state absorption lower level to a high excited level which is equal to or higher than said laser upper level.

27. The method as claimed in claim 26, wherein said first type excitation is a transition of said at least one kind of rare-earth ions from said ground level to said high excited level.

28. The method as claimed in claim 26, wherein said first type excitation is caused by at least one of first type excitation lights, and said first second type excitation is caused by at least one of second type excitation lights different in wavelength from said first type excitation lights.

29. The method as claimed in claim 26,
wherein said laser upper level includes at least one of plural different energy levels thermally coupled with each other,
wherein said laser lower level includes at least one of plural different energy levels thermally coupled with each other,
wherein said excited state absorption upper level includes at least one of plural different energy levels thermally coupled with each other, and
wherein said excited state absorption lower level includes at least one of plural different energy levels thermally coupled with each other.

30. The method as claimed in claim 26, wherein said amplifier medium comprises a fluorozirconate glass doped with erbium ions.

31. The method as claimed in claim 26, wherein a base material of said amplifier medium comprises a fluorozirconate glass.

32. The method as claimed in claim 26, wherein said at least one kind of rare-earth ions comprises erbium ions.

33. The method as claimed in claim 32, wherein said laser upper level includes at least one of $^4S_{3/2}$, and $^2H_{11/2}$, and said laser lower level includes $^4I_{9/2}$, said excited state absorption lower level includes $^4I_{3/2}$, and said excited state absorption upper level includes $^4I_{9/2}$.

34. The method as claimed in claim 28, wherein said first type excitation lights are ranged in wavelength from 960 nanometers to 985 nanometers, and said second type excitation lights are ranged in wavelength from 780 nanometers to 790 nanometers.

35. The method as claimed in claim 32, wherein said first type excitation lights are ranged in wavelength from 795 nanometers to 805 nanometers, and said second type excitation lights are ranged in wavelength from 780 nanometers to 790 nanometers.

36. The method as claimed in claim 33, further including:
supplying said amplifier medium with a gain enhancement light with a wavelength which causes that a ratio $S_1/S_2$ of a first cross section $S_1$ of a transition from $^4S_{3/2}$-level to $^4I_{13/2}$-level to a second cross section $S_2$ of a transition from $^4I_{13/2}$-level to $^4S_{3/2}$-level is ranged from 0.2 to 2.2.

37. The method as claimed in claim 32, wherein $(D \times L)/(S \times P)$ is ranged from 1 to 10, where D is a concentration (ppm) of said erbium ions, L is an interaction length (m) between said amplifier medium and excitation light, S is an interaction cross section ($\mu m^2$) between said amplifier medium and said excitation light, and P is a total power (mW) of said first type excitation light and said second type excitation light which are incident into said amplifier medium.

* * * * *